US011514674B2

(12) United States Patent
Moulon et al.

(10) Patent No.: US 11,514,674 B2
(45) Date of Patent: Nov. 29, 2022

(54) AUTOMATED ANALYSIS OF IMAGE CONTENTS TO DETERMINE THE ACQUISITION LOCATION OF THE IMAGE

(71) Applicant: Zillow, Inc., Seattle, WA (US)

(72) Inventors: Pierre Moulon, Seattle, WA (US); Naji Khosravan, Seattle, WA (US); Yuguang Li, Seattle, WA (US); Yujie Li, Kirkland, WA (US); Ivaylo Boyadzhiev, Seattle, WA (US)

(73) Assignee: Zillow, Inc., Seattle, WA (US)

( * ) Notice: Subject to any disclaimer, the term of this patent is extended or adjusted under 35 U.S.C. 154(b) by 279 days.

(21) Appl. No.: 17/013,323

(22) Filed: Sep. 4, 2020

(65) Prior Publication Data
US 2022/0076019 A1    Mar. 10, 2022

(51) Int. Cl.
*G06K 9/00*     (2022.01)
*G06V 20/00*    (2022.01)
(Continued)

(52) U.S. Cl.
CPC ............. *G06V 20/36* (2022.01); *G01C 21/32* (2013.01); *G05D 1/0219* (2013.01);
(Continued)

(58) Field of Classification Search
CPC ........ G06V 20/36; G06V 20/20; G01C 21/32; G05D 1/0219; G05D 1/0238;
(Continued)

(56) References Cited

U.S. PATENT DOCUMENTS 5,140,352 A   8/1992  Moore et al.
6,031,540 A   2/2000  Golin et al.
(Continued)

FOREIGN PATENT DOCUMENTS

CA   3069813 A1 *  1/2019   ............. G01P 1/127
EP   2413097 A2     2/2012
(Continued)

OTHER PUBLICATIONS

Zhao et al., "SPHORB: A Fast and Robust Binary Feature on the Sphere", Int J Comput Vis (2015) 113:143-159, published Nov. 22, 2014, 17 pages.

(Continued)

*Primary Examiner* — Mahendra R Patel
(74) *Attorney, Agent, or Firm* — VLP Law Group LLP; James A. D. White

(57) ABSTRACT

Techniques are described for using computing devices to perform automated operations for determining the acquisition location of an image using an analysis of the image's visual contents. In at least some situations, images to be analyzed include panorama images acquired at acquisition locations in an interior of a multi-room building, and the determined acquisition location information includes a location on a floor plan of the building and in some cases orientation direction information—in at least some such situations, the acquisition location determination is performed without having or using information from any distance-measuring devices about distances from an image's acquisition location to objects in the surrounding building. The acquisition location information may be used in various automated manners, including for controlling navigation of devices (e.g., autonomous vehicles), for display on one or more client devices in corresponding graphical user interfaces, etc.

23 Claims, 14 Drawing Sheets

(51) Int. Cl.
*G06V 20/20* (2022.01)
*G01C 21/32* (2006.01)
*G05D 1/02* (2020.01)
*H04N 5/232* (2006.01)

(52) U.S. Cl.
CPC ............ *G05D 1/0238* (2013.01); *G06V 20/20* (2022.01); *H04N 5/23238* (2013.01)

(58) Field of Classification Search
CPC ...... H04N 5/23238; G06T 2207/30244; G06T 7/73; G06T 7/70; G06T 2207/10004
USPC ........................................................ 382/103
See application file for complete search history.

(56) References Cited

U.S. PATENT DOCUMENTS

| | | | |
|---|---|---|---|
| 6,141,034 A | 10/2000 | McCutchen | |
| 6,317,166 B1 | 11/2001 | McCutchen | |
| 6,320,584 B1 | 11/2001 | Golin et al. | |
| 6,323,858 B1 | 11/2001 | Gilbert et al. | |
| 6,337,683 B1 | 1/2002 | Gilbert et al. | |
| 6,654,019 B2 | 11/2003 | Gilbert et al. | |
| 6,683,608 B2 | 1/2004 | Golin et al. | |
| 6,690,374 B2 | 2/2004 | Park et al. | |
| 6,731,305 B1 | 5/2004 | Park et al. | |
| 6,738,073 B2 | 5/2004 | Park et al. | |
| 7,050,085 B1 | 5/2006 | Park et al. | |
| 7,129,971 B2 | 10/2006 | McCutchen | |
| 7,196,722 B2 | 3/2007 | White et al. | |
| 7,525,567 B2 | 4/2009 | McCutchen | |
| 7,620,909 B2 | 11/2009 | Park et al. | |
| 7,627,235 B2 | 12/2009 | McCutchen et al. | |
| 7,782,319 B2 | 8/2010 | Ghosh et al. | |
| 7,791,638 B2 | 9/2010 | McCutchen | |
| 7,909,241 B2 | 3/2011 | Stone et al. | |
| 7,973,838 B2 | 7/2011 | McCutchen | |
| 8,072,455 B2 | 12/2011 | Temesvari et al. | |
| 8,094,182 B2 | 1/2012 | Park et al. | |
| RE43,786 E | 11/2012 | Cooper | |
| 8,463,020 B1 | 6/2013 | Schuckmann et al. | |
| 8,517,256 B2 | 8/2013 | Stone et al. | |
| 8,520,060 B2 | 8/2013 | Zomet et al. | |
| 8,523,066 B2 | 9/2013 | Stone et al. | |
| 8,523,067 B2 | 9/2013 | Stone et al. | |
| 8,528,816 B2 | 9/2013 | Stone et al. | |
| 8,540,153 B2 | 9/2013 | Stone et al. | |
| 8,594,428 B2 | 11/2013 | Aharoni et al. | |
| 8,654,180 B2 | 2/2014 | Zomet et al. | |
| 8,699,005 B2 | 4/2014 | Likholyot | |
| 8,705,892 B2 | 4/2014 | Aguilera et al. | |
| RE44,924 E | 6/2014 | Cooper et al. | |
| 8,854,684 B2 | 10/2014 | Zomet | |
| 8,861,840 B2 | 10/2014 | Bell et al. | |
| 8,861,841 B2 | 10/2014 | Bell et al. | |
| 8,879,828 B2 | 11/2014 | Bell et al. | |
| 8,953,871 B2 | 2/2015 | Zomet | |
| 8,989,440 B2 | 3/2015 | Klusza et al. | |
| 8,996,336 B2 | 3/2015 | Malka et al. | |
| 9,021,947 B2 | 5/2015 | Landa | |
| 9,035,968 B2 | 5/2015 | Zomet | |
| 9,041,796 B2 | 5/2015 | Malka et al. | |
| 9,071,714 B2 | 6/2015 | Zomet | |
| 9,129,438 B2 | 9/2015 | Aarts et al. | |
| 9,151,608 B2 | 10/2015 | Malka et al. | |
| 9,165,410 B1 | 10/2015 | Bell et al. | |
| 9,171,405 B1 | 10/2015 | Bell et al. | |
| 9,324,190 B2 | 4/2016 | Bell et al. | |
| 9,361,717 B2 | 6/2016 | Zomet | |
| 9,396,586 B2 | 7/2016 | Bell et al. | |
| 9,438,759 B2 | 9/2016 | Zomet | |
| 9,438,775 B2 | 9/2016 | Powers et al. | |
| 9,489,775 B1 | 11/2016 | Bell et al. | |
| 9,495,783 B1 | 11/2016 | Samarasekera et al. | |
| 9,576,401 B2 | 2/2017 | Zomet | |
| 9,619,933 B2 | 4/2017 | Spinella-Marno et al. | |
| 9,635,252 B2 | 4/2017 | Accardo et al. | |
| 9,641,702 B2 | 5/2017 | Bin-Nun et al. | |
| 9,760,994 B1 | 9/2017 | Bell et al. | |
| 9,786,097 B2 | 10/2017 | Bell et al. | |
| 9,787,904 B2 | 10/2017 | Bidder et al. | |
| 9,836,885 B1 | 12/2017 | Eraker et al. | |
| 9,852,351 B2 | 12/2017 | Aguilera Perez et al. | |
| 9,953,111 B2 | 4/2018 | Bell et al. | |
| 9,953,430 B1 | 4/2018 | Zakhor | |
| 9,990,760 B2 | 6/2018 | Aguilera Perez et al. | |
| 9,990,767 B1 | 6/2018 | Sheffield et al. | |
| 10,026,224 B2 | 7/2018 | Bell et al. | |
| 10,030,979 B2 | 7/2018 | Bjorke et al. | |
| 10,055,876 B2 | 8/2018 | Ford et al. | |
| 10,068,344 B2 | 9/2018 | Jovanovic et al. | |
| 10,083,522 B2* | 9/2018 | Jovanovic | G06T 5/006 |
| 10,102,639 B2 | 10/2018 | Bell et al. | |
| 10,102,673 B2 | 10/2018 | Eraker et al. | |
| 10,120,397 B1 | 11/2018 | Zakhor et al. | |
| 10,122,997 B1 | 11/2018 | Sheffield et al. | |
| 10,127,718 B2 | 11/2018 | Zakhor et al. | |
| 10,127,722 B2 | 11/2018 | Shakib et al. | |
| 10,139,985 B2 | 11/2018 | Mildrew et al. | |
| 10,163,261 B2 | 12/2018 | Bell et al. | |
| 10,163,271 B1 | 12/2018 | Powers et al. | |
| 10,181,215 B2* | 1/2019 | Sedeffow | G06T 3/0062 |
| 10,192,115 B1 | 1/2019 | Sheffield et al. | |
| 10,204,185 B2 | 2/2019 | Mrowca et al. | |
| 10,210,285 B2 | 2/2019 | Wong et al. | |
| 10,235,797 B1 | 3/2019 | Sheffield et al. | |
| 10,242,400 B1 | 3/2019 | Eraker et al. | |
| 10,339,716 B1 | 7/2019 | Powers et al. | |
| 10,366,531 B2 | 7/2019 | Sheffield | |
| 10,395,435 B2* | 8/2019 | Powers | G06Q 30/0643 |
| 10,708,507 B1 | 7/2020 | Dawson et al. | |
| 2006/0256109 A1 | 11/2006 | Acker et al. | |
| 2010/0232709 A1 | 9/2010 | Zhang et al. | |
| 2012/0075414 A1 | 3/2012 | Park et al. | |
| 2012/0293613 A1 | 11/2012 | Powers et al. | |
| 2013/0050407 A1 | 2/2013 | Brinda et al. | |
| 2013/0342533 A1 | 12/2013 | Bell et al. | |
| 2014/0043436 A1 | 2/2014 | Bell et al. | |
| 2014/0044343 A1 | 2/2014 | Bell et al. | |
| 2014/0044344 A1 | 2/2014 | Bell et al. | |
| 2014/0125658 A1 | 5/2014 | Bell et al. | |
| 2014/0125767 A1 | 5/2014 | Bell et al. | |
| 2014/0125768 A1 | 5/2014 | Bell et al. | |
| 2014/0125769 A1 | 5/2014 | Bell et al. | |
| 2014/0125770 A1 | 5/2014 | Bell et al. | |
| 2014/0236482 A1 | 8/2014 | Dorum et al. | |
| 2014/0267631 A1 | 9/2014 | Powers et al. | |
| 2014/0307100 A1 | 10/2014 | Myllykoski et al. | |
| 2015/0084951 A1* | 3/2015 | Boivin | H04N 5/2621 345/419 |
| 2015/0116691 A1* | 4/2015 | Likholyot | G01C 15/002 356/4.01 |
| 2015/0189165 A1 | 7/2015 | Milosevski et al. | |
| 2015/0262421 A1* | 9/2015 | Bell | G06T 3/40 345/423 |
| 2015/0269785 A1 | 9/2015 | Bell et al. | |
| 2015/0302636 A1 | 10/2015 | Arnoldus et al. | |
| 2015/0310596 A1 | 10/2015 | Sheridan et al. | |
| 2015/0332464 A1 | 11/2015 | O'Keefe et al. | |
| 2016/0055268 A1 | 2/2016 | Bell et al. | |
| 2016/0134860 A1 | 5/2016 | Jovanovic et al. | |
| 2016/0140676 A1 | 5/2016 | Fritze et al. | |
| 2016/0217225 A1 | 7/2016 | Bell et al. | |
| 2016/0260250 A1 | 9/2016 | Jovanovic et al. | |
| 2016/0286119 A1* | 9/2016 | Rondinelli | G03B 17/12 |
| 2016/0300385 A1 | 10/2016 | Bell et al. | |
| 2017/0034430 A1 | 2/2017 | Fu et al. | |
| 2017/0067739 A1* | 3/2017 | Siercks | G01C 15/002 |
| 2017/0194768 A1 | 7/2017 | Powers et al. | |
| 2017/0195654 A1 | 7/2017 | Powers et al. | |
| 2017/0263050 A1 | 9/2017 | Ha et al. | |
| 2017/0324941 A1 | 11/2017 | Birkler | |
| 2017/0330273 A1 | 11/2017 | Holt et al. | |
| 2017/0337737 A1 | 11/2017 | Edwards et al. | |

(56) References Cited

U.S. PATENT DOCUMENTS

| | | |
|---|---|---|
| 2018/0025536 A1 | 1/2018 | Bell et al. |
| 2018/0075168 A1* | 3/2018 | Tiwari .............. G06T 3/0068 |
| 2018/0139431 A1* | 5/2018 | Simek .............. H04N 13/254 |
| 2018/0143023 A1 | 5/2018 | Bjorke et al. |
| 2018/0143756 A1 | 5/2018 | Mildrew et al. |
| 2018/0144487 A1 | 5/2018 | Bell et al. |
| 2018/0144535 A1 | 5/2018 | Ford et al. |
| 2018/0144547 A1 | 5/2018 | Shakib et al. |
| 2018/0144555 A1 | 5/2018 | Ford et al. |
| 2018/0146121 A1 | 5/2018 | Hensler et al. |
| 2018/0146193 A1 | 5/2018 | Safreed et al. |
| 2018/0146212 A1 | 5/2018 | Hensler et al. |
| 2018/0165871 A1 | 6/2018 | Mrowca |
| 2018/0203955 A1 | 7/2018 | Bell et al. |
| 2018/0241985 A1 | 8/2018 | O'Keefe et al. |
| 2018/0293793 A1 | 10/2018 | Bell et al. |
| 2018/0300936 A1 | 10/2018 | Ford et al. |
| 2018/0306588 A1 | 10/2018 | Bjorke et al. |
| 2018/0348854 A1 | 12/2018 | Powers et al. |
| 2018/0365496 A1 | 12/2018 | Hovden et al. |
| 2019/0012833 A1 | 1/2019 | Eraker et al. |
| 2019/0026956 A1 | 1/2019 | Gausebeck et al. |
| 2019/0026957 A1 | 1/2019 | Gausebeck |
| 2019/0026958 A1* | 1/2019 | Gausebeck .............. G06T 7/521 |
| 2019/0035165 A1 | 1/2019 | Gausebeck |
| 2019/0041972 A1 | 2/2019 | Bae |
| 2019/0050137 A1 | 2/2019 | Mildrew et al. |
| 2019/0051050 A1 | 2/2019 | Bell et al. |
| 2019/0051054 A1 | 2/2019 | Jovanovic et al. |
| 2019/0087067 A1 | 3/2019 | Hovden et al. |
| 2019/0122422 A1 | 4/2019 | Sheffield et al. |
| 2019/0164335 A1 | 5/2019 | Sheffield et al. |
| 2019/0180104 A1 | 6/2019 | Sheffield et al. |
| 2019/0251645 A1 | 8/2019 | Winans |
| 2019/0287164 A1 | 9/2019 | Eraker et al. |
| 2020/0074668 A1* | 3/2020 | Stenger .............. G06V 10/82 |

FOREIGN PATENT DOCUMENTS

| | | | |
|---|---|---|---|
| EP | 2505961 A2 | 10/2012 | |
| EP | 2506170 A2 | 10/2012 | |
| EP | 2821750 A1 * | 1/2015 | .............. G01C 15/00 |
| GB | 2541884 A * | 3/2017 | .............. A47L 9/009 |
| JP | 2020-038657 A | 3/2020 | |
| JP | 6980755 B2 * | 12/2021 | .............. B25J 19/02 |
| KR | 101770648 B1 | 8/2017 | |
| KR | 101930796 B1 | 12/2018 | |
| WO | 2005091894 A2 | 10/2005 | |
| WO | 2016154306 A1 | 9/2016 | |
| WO | 2018204279 A1 | 11/2018 | |
| WO | 2019083832 A1 | 5/2019 | |
| WO | 2019104049 A1 | 5/2019 | |
| WO | 2019118599 A2 | 6/2019 | |

OTHER PUBLICATIONS

Andersen et al., "HMD-Guided Image-Based Modeling and Rendering of Indoor Scenes", EuroVR 2018, LNCS 11162, pp. 73-93, 2018, 21 pages.
CubiCasa | From video to floor plan in under 5 minutes, retrieved on Mar. 26, 2019, from https://www.cubi.casa/, 6 pages.
CubiCasa FAQ & Manual, retrieved on Mar. 26, 2019, from https://www.cubi.casa/faq/, 5 pages.
Cupix Home, retrieved on Mar. 26, 2019, from https://www.cupix.com/, 1 page.
Cupix—FAQ, retrieved on Mar. 26, 2019, from https://www.cupix.com/faq.html, 3 pages.
IGuide: 3D Virtual Tours, retrieved on Mar. 26, 2019, from https://goiguide.com/, 6 pages.
immoviewer.com | Automated Video Creation & Simple Affordable 3D 360 Tours, retrieved on Mar. 26, 2019, from https://www.immoviewer.com/, 5 pages.
MagicPlan | #1 Floor Plan App, Construction & Surveying Samples, retrieved on Mar. 26, 2019, from https://www.magicplan.app/, 9 pages.
EyeSpy360 Virtual Tours | Virtual Tour with any 360 camera, retrieved on Mar. 27, 2019, from https://www.eyespy360.com/en-us/, 15 pages.
Indoor Reality, retrieved on Mar. 27, 2019, from https://www.indoorreality.com/, 9 pages.
InsideMaps, retrieved on Mar. 27, 2019, from https://www.insidemaps.com/, 7 pages.
IStaging | Augmented & Virtual Reality Platform For Business, retrieved on Mar. 27, 2019, from https://www.istaging.com/en/, 7 pages.
Metareal, retrieved on Mar. 27, 2019, from https://www.metareal.com/, 4 pages.
PLNAR—The AR 3D Measuring / Modeling Platform, retrieved on Mar. 27, 2019, from https://www.plnar.co, 6 pages.
YouVR Global, retrieved on Mar. 27, 2019, from https://global.youvr.io/, 9 pages.
GeoCV, retrieved on Mar. 28, 2019, from https://geocv.com/, 4 pages.
Biersdorfer, J.D., "How To Make A 3-D Model Of Your Home Renovation Vision," in The New York Times, Feb. 13, 2019, retrieved Mar. 28, 2019, 6 pages.
Chen et al. "Rise of the indoor crowd: Reconstruction of building interior view via mobile crowdsourcing." In: Proceedings of the 13th ACM Conference on Embedded Networked Sensor Systems. Nov. 4, 2015, 13 pages.
Immersive 3D for the Real World, retrieved from https://matterport.com/, on Mar. 27, 2017, 5 pages.
Learn About Our Complete 3D System, retrieved from https://matterport.com/how-it-works/, on Mar. 27, 2017, 6 pages.
Surefield FAQ, retrieved from https://surefield.com/faq, on Mar. 27, 2017, 1 page.
Why Surefield, retrieved from https://surefield.com/why-surefield, on Mar. 27, 2017, 7 pages.
Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.
Tango (platform), Wikipedia, retrieved from https://en.wikipedia.org/wiki/Tango_(platform), on Jun. 12, 2018, 5 pages.
Zou et al. "LayoutNet: Reconstructing the 3D Room Layout from a Single RGB Image" in arXiv:1803.08999, submitted Mar. 23, 2018, 9 pages.
Lee et al. "RoomNet: End-to-End Room Layout Estimation" in arXiv:1703.00241v2, submitted Aug. 7, 2017, 10 pages.
Time-of-flight camera, Wikipedia, retrieved from https://en.wikipedia.org/wiki/Time-of-flight_camera, on Aug. 30, 2018, 8 pages.
Magicplan—Android Apps on Go . . . , retrieved from https://play.google.com/store/apps/details?id=com.sensopia.magicplan, on Feb. 21, 2018, 5 pages.

* cited by examiner

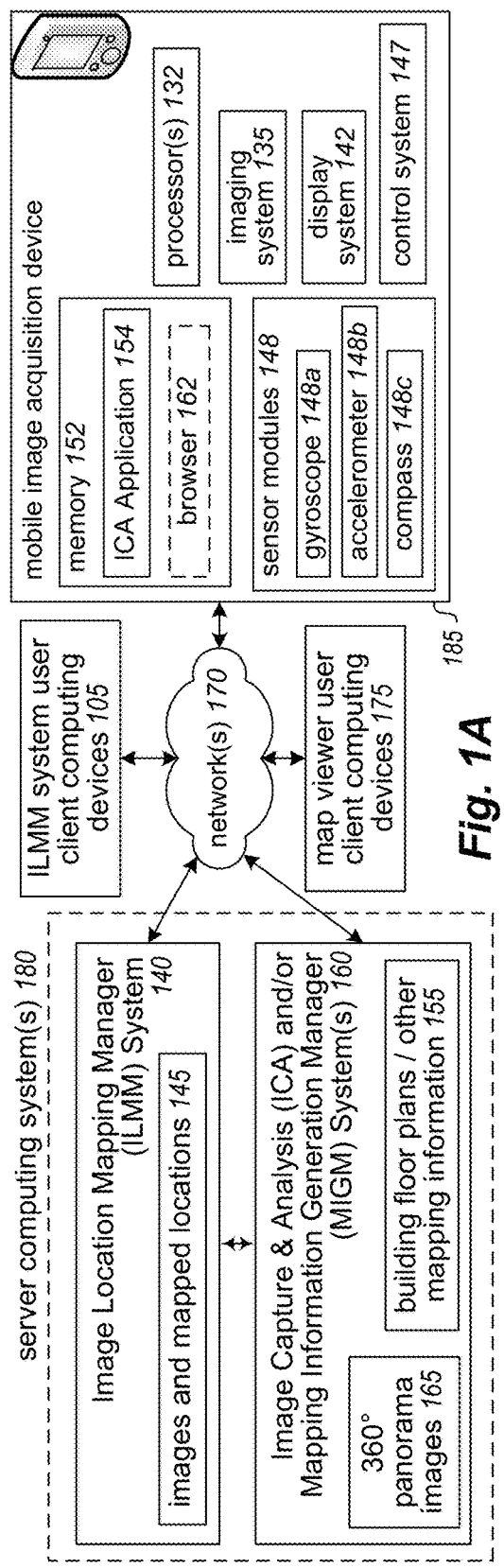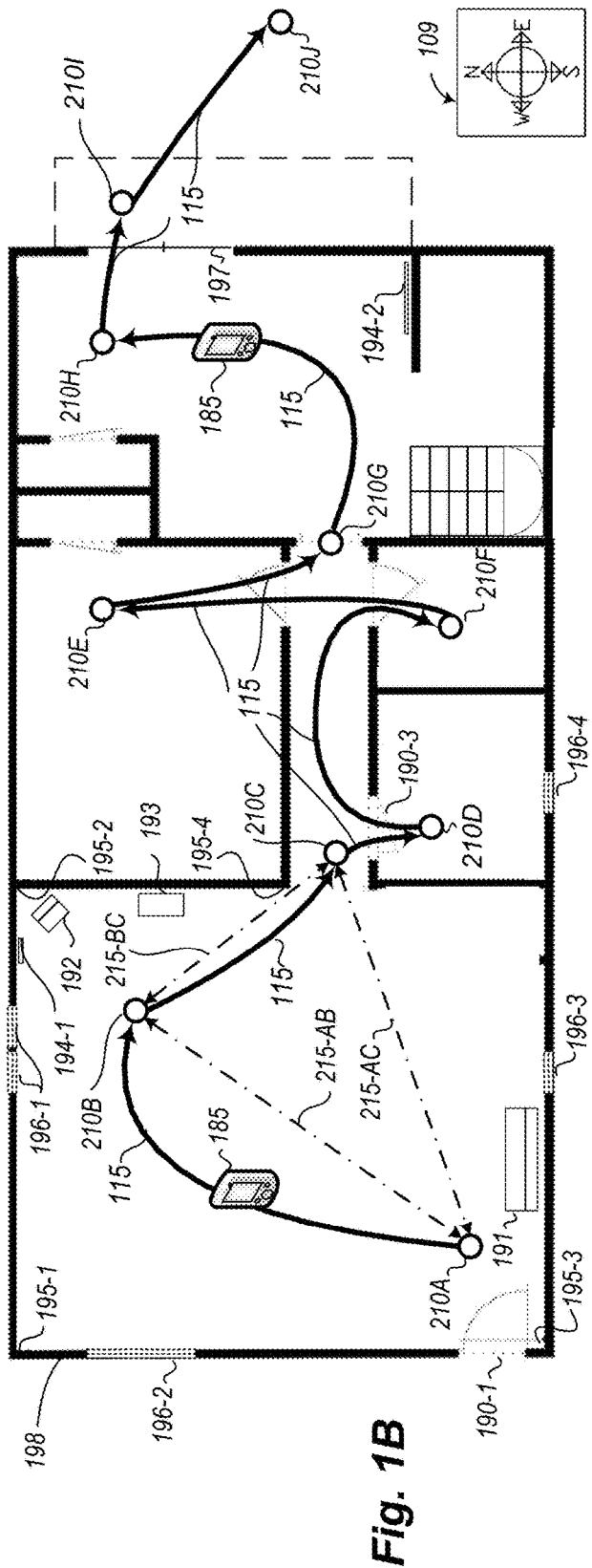
Fig. 1A
Fig. 1B

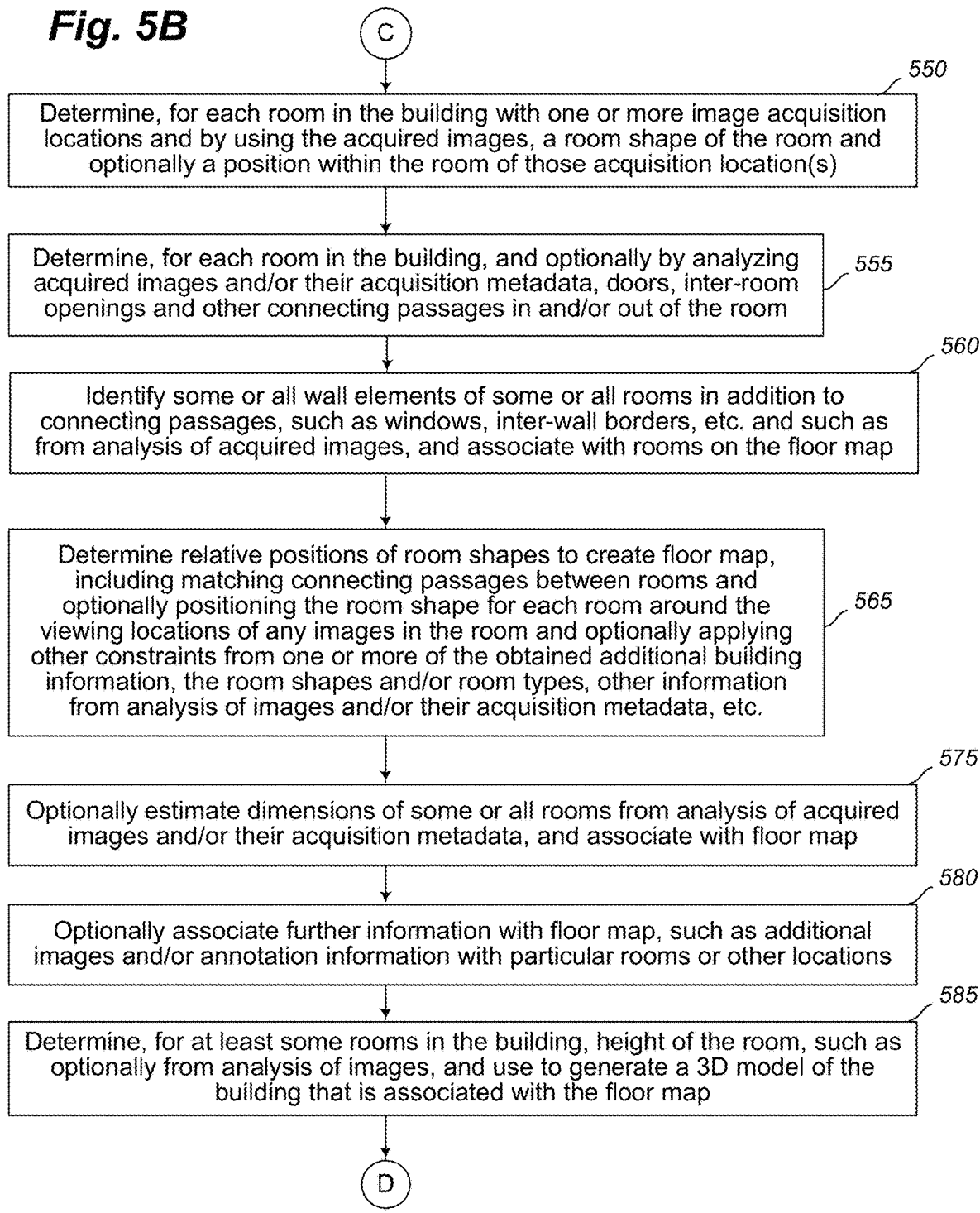

AUTOMATED ANALYSIS OF IMAGE CONTENTS TO DETERMINE THE ACQUISITION LOCATION OF THE IMAGE

TECHNICAL FIELD

The following disclosure relates generally to techniques for automatically determining the acquisition location of an image based on an analysis of the image's contents and for subsequently using the determined acquisition location information in one or more manners, such as to locate an image of an interior of a room in a building on a floor plan of the building and to use the image location to improve navigation of the building.

BACKGROUND

In various fields and circumstances, such as architectural analysis, property inspection, real estate acquisition and development, general contracting, improvement cost estimation, etc., it may be desirable to know the interior of a house, office, or other building without having to physically travel to and enter the building. However, it can be difficult to effectively capture, represent and use such building interior information, including to display visual information captured within building interiors to users at remote locations (e.g., to enable a user to fully understand the layout and other details of the interior, including to control the display in a user-selected manner). In addition, while a floor plan of a building may provide some information about layout and other details of a building interior, such use of floor plans has some drawbacks, including that floor plans can be difficult to construct and maintain, to accurately scale and populate with information about room interiors, to visualize and otherwise use, etc.

BRIEF DESCRIPTION OF THE DRAWINGS

FIGS. 1A-1B are diagrams depicting an exemplary building interior environment and computing system(s) for use in embodiments of the present disclosure, including to generate and present information representing an interior of the building.

FIGS. 5A-5B illustrate an example embodiment of a flow diagram for a Mapping Information Generation Manager (MIGM) system routine in accordance with an embodiment of the present disclosure.

DETAILED DESCRIPTION

Figure 2A:
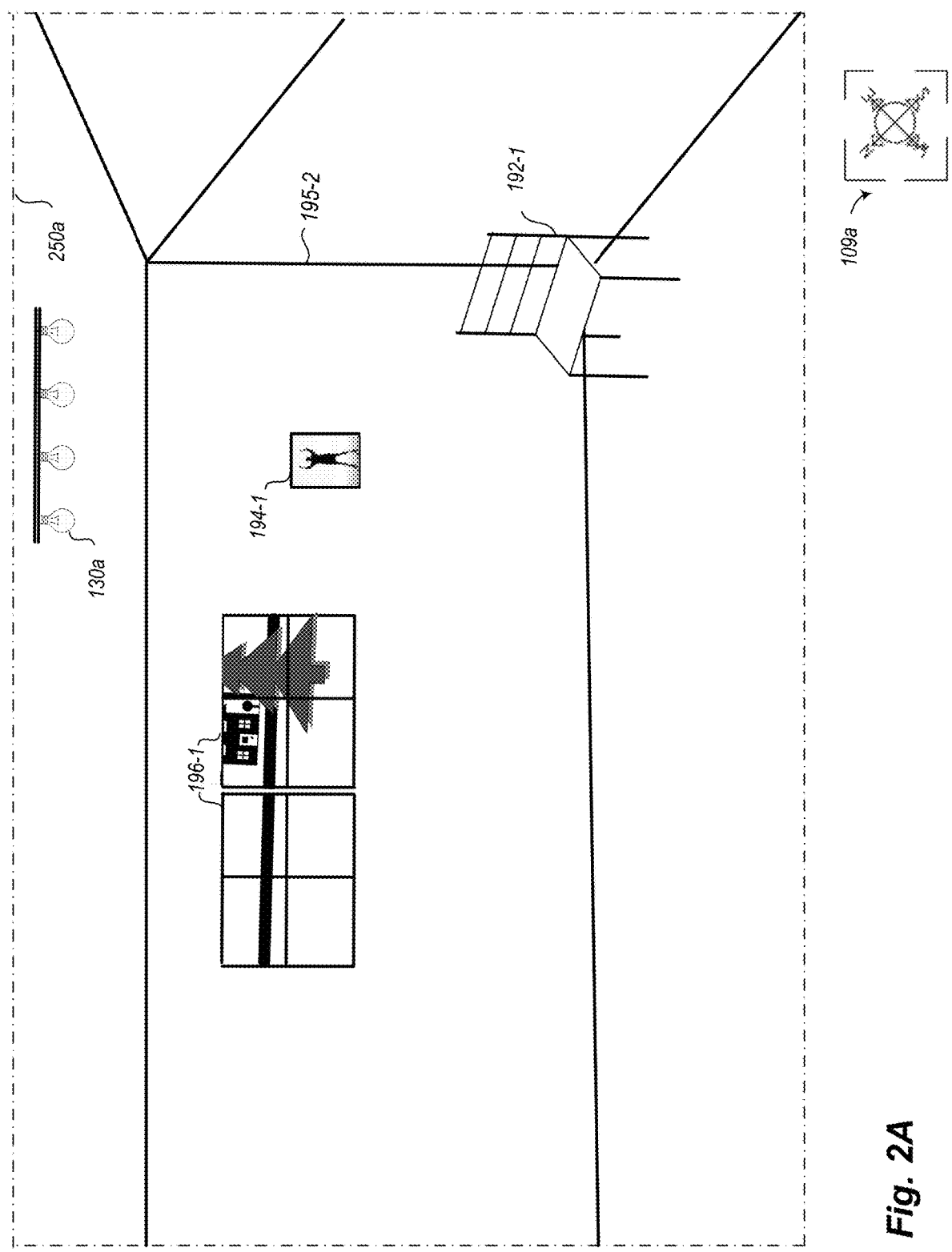
FIGS. 2A-2G illustrate examples of automatically generating and presenting information on a floor plan for a building based on one or more images taken in the building interior, such as to automatically determine and present an acquisition location of such image(s) from analysis of image contents.

The present disclosure describes techniques for using computing devices to perform automated operations related to determining the acquisition location of an image based at least in part on an analysis of the image's contents (e.g., visual information present in the image), and for subsequently using the determined image acquisition location information in one or more further automated manners. In at least some embodiments, images to be analyzed include one or more panorama images or other images (e.g., rectilinear perspective images) acquired at one or more acquisition locations in an interior of a multi-room building (e.g., a house, office, etc.), and the determined image acquisition location information includes at least a location on a floor plan of the building and in some situations further includes an orientation or other direction information for at least a part of the image(s)—in at least some such embodiments, the automated image acquisition location determination is further performed without having or using information from any depth sensors or other distance-measuring devices about distances from an image's acquisition location to walls or other objects in the surrounding building. The determined image acquisition location information may be further used in various manners in various embodiments, such as in conjunction with a corresponding building floor plan and/or other generated mapping-related information, including for controlling navigation of mobile devices (e.g., autonomous vehicles), for display or other presentation on one or more client devices in corresponding GUIs (graphical user interfaces), etc. Additional details are included below regarding the automated acquisition and use of determined image acquisition location information, and some or all of the techniques described herein may, in at least some embodiments, be performed via automated operations of an Image Location Mapping Manager ("ILMM") system, as discussed further below.

In at least some embodiments and situations, some or all of the images acquired for a building may be panorama images that are each acquired at one of multiple acquisition locations in or around the building, such as to generate a panorama image at each such acquisition location from one or more of a video at that acquisition location (e.g., a 360° video taken from a smartphone or other mobile device held by a user turning at that acquisition location), or multiple images acquired in multiple directions from the acquisition location (e.g., from a smartphone or other mobile device held by a user turning at that acquisition location), or a simultaneous capture of all the image information (e.g., using one or more fisheye lenses), etc. It will be appreciated that such a panorama image may in some situations be represented in a spherical coordinate system and provide up to 360° coverage around horizontal and/or vertical axes, such that a user viewing a starting panorama image may move the viewing direction within the starting panorama image to different orientations to cause different images (or "views") to be rendered within the starting panorama image (including, if the panorama image is represented in a spherical coordinate system, to convert the image being rendered into a planar coordinate system). Furthermore, acquisition metadata regarding the capture of such panorama images may be obtained and used in various manners, such as data acquired from IMU (inertial measurement unit) sensors or other sensors of a mobile device as it is carried by a user or otherwise moved between acquisition locations. Additional details are included below related to the acquisition and usage of panorama images or other images for a building.

As noted above, automated operations of an ILMM system may include determining the acquisition location of an image that is captured in a defined area (e.g., in a room of a house or other building) based at least in part on an analysis of the visual information included in the image's contents. In at least some embodiments, such automated determination of an image's acquisition location may include some or all of the following: identifying elements visible in the image contents, such as structural elements of visible walls (e.g., wall elements such as doors, windows, inter-wall borders, etc.); determining positions of such identified elements at respective angles within the visual information of the image's contents; encoding that identified angular element position information in a format that facilitates comparison to similar information for one or more rooms of a building (with the resulting encoded angular element position information for the image referred to generally herein as an image angular descriptor); and using the generated image angular descriptor to identify matching information for a particular location in a particular room. In other embodiments and situations, the wall element information (or other types of visible elements) for an image may be identified and represented in manners other than based on angular differences from a starting direction of the image, resulting in other types of image descriptors that are used in similar manners.

Consider, for the purposes of an illustrative example, a panorama image captured in a room of a building, with the panorama image including 360° of horizontal coverage around a vertical axis (e.g., a full circle showing all of the walls of the room from the acquisition location of the panorama image), and with the x and y axes of the image's visual contents being aligned with corresponding horizontal and vertical information in the room (e.g., the border between two walls, the border between a wall and the floor, the bottoms and/or tops of windows and doors, etc.), such that the image is not skewed or otherwise misaligned with respect to the room. For the purposes of this example, the image capture may be performed sequentially at multiple directions from an acquisition location using changing camera orientations, beginning with a camera orientation in a northern direction that corresponds to a relative starting horizontal direction of 0° for this panorama image, and continues in a circle, with a relative 90° horizontal direction for this panorama image then corresponding to the eastern direction, a relative 180° horizontal direction for this panorama image corresponding to the southern direction, a relative 270° horizontal direction for this panorama image corresponding to the western direction, and a relative 360° ending horizontal direction for this panorama image being back to the northern direction. In at least some embodiments, the information about the locations of identified elements in the panorama image are encoded in a manner specific to such angular degrees of direction from the acquisition location (e.g., relative to the starting direction of the panorama image), producing an image angular descriptor for the image—thus, the image angular descriptor for such an image may encode information about what wall elements are visible in each of 360 horizontal degrees. For example, if a window was present in the room in a direction that is directly north of the image acquisition location and is visible in the panorama image (e.g., not obscured by intervening furniture), the information for the 0° relative direction angle of the image in the resulting image angular descriptor (and for the 360° relative direction of the image, if represented separately from the 0° direction) would include an identification of the presence of the window in that angular direction. Such information about the locations of identified elements may be encoded and stored in various manners in various embodiments, including in some embodiments in a vector having one or more values for each angular degree of direction, such as to identify each wall element present in a given angular direction. Additional details are included below regarding the construction and use of such image angular descriptors, including with respect to the examples of FIGS. 2D-2E and their associated description.

In addition, the use of an image's generated image angular descriptor for an automated determination of the acquisition location of the image in a room of a building (or other defined area) may include matching such angular information for the image to corresponding angular information in the building, such as to a particular location in the room. In at least some embodiments, a plurality of room locations are identified in the building (e.g., by creating a grid of room locations that substantially or completely covers the room floor), and a building angular descriptor is created for each such room location to include similar angular information about wall elements of the room for that room location—thus, given a specified starting direction as 0° (e.g., the northern direction), the building angular descriptor for such a room location may encode information about what wall elements are part of the room in a direction from that room location for each of 360 horizontal degrees. Such building angular descriptors may be predetermined, for example, before any corresponding image angular descriptors are generated or used, or may instead in some situations be dynamically created at a time of use for comparison to an image angular descriptor for an image taken in the room.

Once a plurality of building angular descriptors are generated or otherwise obtained for a plurality of room locations in a room, they may be compared or otherwise matched to an image angular descriptor for an image taken in the room in order to determine one of the building angular descriptors that is a best match, with the acquisition location of the image then being identified based on the room location of that best match building angular descriptor. For example, the image's determined acquisition location may be selected to be that room location of that best match building angular descriptor in some embodiments and situations, or instead in other embodiments and situations may be determined to be within a small distance from that room location (e.g., in a direction and/or amount based on differences between the image angular descriptor and that best match building angular descriptor). The matching process for an image angular descriptor and a building angular descriptor may include determining a distance and/or or amount of similarity/dissimilarity between the two angular descriptors in one or more manners, such as by determining the probability that two angular descriptors are matching (with the highest matching probability corresponding to the smallest dissimilarity and/or distance), by measuring the differences between the vectors or other encoded formats for the angular descriptors being compared, etc.—as one non-exclusive example, a circular earth mover's distance metric may be used to compare the vectors for two such angular descriptors in a rotation-independent manner (e.g., regardless of whether the two angular descriptors use the same direction in the room as their respective relative 0° s), while in other embodiments differences in rotation between two descriptors may be handled in other manners. In addition, the matching process may in some embodiments include comparing the image angular descriptor to each possible building angular descriptor, while in other embodiments only a subset of the building angular descriptors may be considered (e.g., by performing a nearest neighbor gradient ascent or descent search using a defined similarity or dissimilarity metric). Additional details are included below regarding the construction and use of such building angular descriptors, including for comparison to one or more image angular descriptors, such as with respect to the example of FIG. 2E and its associated description.

In addition, further automated operations may be performed in at least some embodiments as part of an automated determination of the acquisition location of an image captured in a room. For example, in at least some embodiments, a geometric localization technique may be used to test associations of wall elements visible in an image to wall elements present in a room, whether to confirm a degree of match for a building angular descriptor that has already been determined to be a best match for an image angular descriptor and/or as part of the identification of such a best match building angular descriptor. The geometric localization technique may include, for example, determining one or more likely room shapes of a room and/or positions of elements within the room using 2-point solvers and/or 3-point solvers, and then positioning the wall elements on the likely room shape(s)—in other embodiments, the wall element locations may be determined in other manners, such as via use of depth sensing equipment or other room mapping sensors in the room, via a machine learning approach for analysis of images to identify room shapes and wall element locations, via input specified by one or more human operators, etc. Furthermore, in some embodiments, given a room location and information about a room shape and the locations of wall elements, a new synthetic image that is a projection/visualization of a view of the room from that room location may be generated with the wall elements shown in their locations, and the visual information of that synthetic image may be directly compared to the actual image from the room to determine a degree of similarity/dissimilarity or other degree of match between the two images, with that inter-image comparison used to determine if that room location is a match for the acquisition location of the actual image. In a similar manner, in some embodiments, some or all of the building angular descriptors for room locations in a room may be generated as image angular descriptors of images (e.g., 360° panorama images) taken at those room locations, and those room/image angular descriptors may then be compared to an image angular descriptor of a new image taken in the room (e.g., an image with less than 360° of horizontal coverage) to determine a best match building angular descriptor in a manner similar to that discussed above.

The automated determination of the acquisition location of an image taken in a room may further include additional operations in some embodiments. For example, in at least some embodiments, machine learning techniques may be used to learn the best encoding to allow matching of an image to a room location, such as from among multiple defined candidate encodings, or instead by considering a variety of possible image elements to analyzing and identifying a subset of those image elements that provide best matches to corresponding room locations. Additional details are included below regarding various automated operations that may be performed by the ILMM system in at least some embodiments.

The described techniques provide various benefits in various embodiments, including to allow floor plans of multi-room buildings and other structures to be automatically augmented with information about acquisition locations at which images are acquired in the buildings or other structures, including without having or using information from depth sensors or other distance-measuring devices about distances from images' acquisition locations to walls or other objects in a surrounding building or other structure. Furthermore, such automated techniques allow such image acquisition location information to be determined more quickly than previously existing techniques, and in at least some embodiments with greater accuracy, including by using information acquired from the actual building environment (rather than from plans on how the building should theoretically be constructed), as well as enabling the capture of changes to structural elements that occur after a building is initially constructed. Such described techniques further provide benefits in allowing improved automated navigation of a building by mobile devices (e.g., semi-autonomous or fully-autonomous vehicles), based at least in part on the determined acquisition locations of images, including to significantly reduce computing power and time used to attempt to otherwise learn a building's layout. In addition, in some embodiments the described techniques may be used to provide an improved GUI in which a user may more accurately and quickly obtain information about a building's interior (e.g., for use in navigating that interior), including in response to search requests, as part of providing personalized information to the user, as part of providing value estimates and/or other information about a building to a user, etc. Various other benefits are also provided by the described techniques, some of which are further described elsewhere herein.

As noted above, automated operations of an ILMM system may include determining the acquisition location of an image that is taken in a defined area (e.g., in a room of a house or other building) based at least in part on an analysis of the visual information included in the image's contents. In at least some embodiments, such an ILMM system may operate in conjunction with one or more separate ICA (Image Capture and Analysis) systems and/or with one or more separate MIGM (Mapping Information and Generation Manager) systems, such as to obtain and use floor plans and other associated information for buildings from the ICA and/or MIGM systems, while in other embodiments such an ILMM system may incorporate some or all functionality of such ICA and/or MIGM systems as part of the ILMM system. In yet other embodiments, the ILMM system may operate without using some or all functionality of the ICA and/or MIGM systems, such as if the ILMM system obtains information about building floor plans and/or other associated information from other sources (e.g., from manual creation by one or more users, from provision of such building floor plans and/or associated information by one or more external systems or other sources, etc.). In addition, building floor plans that are used in the manner described herein may be in various formats (whether as originally obtained and/or after an initial automated analysis by the ILMM system), including in at least some embodiments to be in a vectorized form with specified information about the locations of structural elements such as one or more of the following: walls, windows, doorways and other inter-room openings, corners, etc. (e.g., after initially receiving a non-vectorized image form of the building floor plan that analyzed to produce the vectorized form).

With respect to functionality of such an ICA system, it may perform automated operations in at least some embodiments to acquire images (e.g., panorama images) at various acquisition locations associated with a building (e.g., in the interior of multiple rooms of the building), and optionally further acquire metadata related to the image acquisition process and/or to movement of a capture device between acquisition locations. For example, in at least some such embodiments, such techniques may include using one or more mobile devices (e.g., a camera having one or more fisheye lenses and mounted on a rotatable tripod or otherwise having an automated rotation mechanism; a camera having one or more fisheye lenses sufficient to capture 360 degrees horizontally without rotation; a smart phone held and moved by a user, such as to rotate the user's body and held smart phone in a 360° circle around a vertical axis; a camera held by or mounted on a user or the user's clothing; a camera mounted on an aerial and/or ground-based drone or robotic device; etc.) to capture visual data from a sequence of multiple acquisition locations within multiple rooms of a house (or other building), but without acquiring information from any depth sensors or other distance-measuring devices about distances between the acquisition locations and objects in an environment around the acquisition locations. Additional details are included elsewhere herein regarding operations of device(s) implementing an ICA system, such as to perform such automated operations, and in some cases to further interact with one or more ICA system operator user(s) in one or more manners to provide further functionality.

With respect to functionality of such an MIGM system, it may perform automated operations in at least some embodiments to analyze multiple 360° panorama images (and optionally other images) that have been acquired for a building interior (and optionally an exterior of the building), and determine room shapes and locations of passages connecting rooms for some or all of those panorama images, as well as to determine wall elements and other elements of some or all rooms of the building in at least some embodiments and situations. The types of connecting passages between two or more rooms may include one or more of doorway openings and other inter-room non-doorway wall openings, windows, stairways, non-room hallways, etc., and the automated analysis of the images may identify such elements based at least in part on identifying the outlines of the passages, identifying different content within the passages than outside them (e.g., different colors or shading), etc. The automated operations may further include using the determined information to generate a floor plan for the building and to optionally generate other mapping information for the building, such as by using the inter-room passage information and other information to determine relative positions of the associated room shapes to each other, and to optionally add distance scaling information and/or various other types of information to the generated floor plan. In addition, the MIGM system may in at least some embodiments perform further automated operations to determine and associate additional information with a building floor plan and/or specific rooms or locations within the floor plan, such as to analyze images and/or other environmental information (e.g., audio) captured within the building interior to determine particular attributes (e.g., a color and/or material type and/or other characteristics of particular elements, such as a floor, wall, ceiling, countertop, furniture, fixtures, appliances, etc.; the presence and/or absence of particular elements, such as an island in the kitchen; etc.), or to otherwise determine relevant attributes (e.g., directions that building elements face, such as windows; views from particular windows or other locations; etc.). Additional details are included below regarding operations of computing device(s) implementing an MIGM system, such as to perform such automated operations and in some cases to further interact with one or more MIGM system operator user(s) in one or more manners to provide further functionality.

For illustrative purposes, some embodiments are described below in which specific types of information are acquired, used and/or presented in specific ways for specific types of structures and by using specific types of devices—however, it will be understood that the described techniques may be used in other manners in other embodiments, and that the invention is thus not limited to the exemplary details provided. As one non-exclusive example, while specific types of angular descriptors are generated for images and for room locations and are compared or otherwise matched in specific manners in some embodiments, it will be appreciated that other types of information to describe image contents and room locations may be similarly generated and used in other embodiments, including for buildings (or other structures or layouts) separate from houses, and that determined image acquisition location information may be used in other manners in other embodiments. In addition, the term "building" refers herein to any partially or fully enclosed structure, typically but not necessarily encompassing one or more rooms that visually or otherwise divide the interior space of the structure—non-limiting examples of such buildings include houses, apartment buildings or individual apartments therein, condominiums, office buildings, commercial buildings or other wholesale and retail structures (e.g., shopping malls, department stores, warehouses, etc.), etc. The term "acquire" or "capture" as used herein with reference to a building interior, acquisition location, or other location (unless context clearly indicates otherwise) may refer to any recording, storage, or logging of media, sensor data, and/or other information related to spatial characteristics and/or visual characteristics and/or otherwise perceivable characteristics of the building interior or subsets thereof, such as by a recording device or by another device that receives information from the recording device. As used herein, the term "panorama image" may refer to a visual representation that is based on, includes or is separable into multiple discrete component images originating from a substantially similar physical location in different directions and that depicts a larger field of view than any of the discrete component images depict individually, including images with a sufficiently wide-angle view from a physical location to include angles beyond that perceivable from a person's gaze in a single direction. The term "sequence" of acquisition locations, as used herein, refers generally to two or more acquisition locations that are each visited at least once in a corresponding order, whether or not other non-acquisition locations are visited between them, and whether or not the visits to the acquisition locations occur during a single continuous period of time or at multiple different times, or by a single user and/or device or by multiple different users and/or devices. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify the same or similar elements or acts.

FIG. 1A is an example block diagram of various computing devices and systems that may participate in the described techniques in some embodiments. In particular, one or more linked panorama images 165 are illustrated in FIG. 1A that have been generated by an Interior Capture and Analysis ("ICA") system 160 executing in this example on one or more server computing systems 180, such as with respect to one or more buildings or other structures—FIG. 1B shows one example of such linked panorama images for a particular house 198, as discussed further below, and additional details related to the automated operation of the ICA system are included elsewhere herein, including with respect to FIG. 4. An MIGM (Mapping Information Generation Manager) system 160 is further executing on one or more server computing systems 180 in FIG. 1A to generate and provide building floor plans 155 and/or other mapping-related information based on use of the linked panorama images 165 and optionally associated metadata about their acquisition and linking—FIG. 2G shows one example of such a floor plan, as discussed further below, and additional details related to the automated operation of the MIGM system are included elsewhere herein, including with respect to FIGS. 5A-5B.

FIG. 1A further illustrates an ILMM (Image Location Mapping Manager) system 140 that is executing on one or more server computing systems 180 to determine acquisition locations of additional images 145 (e.g., panorama images) acquired in one or more building rooms, such as with respect to corresponding building floor plans 155. In at least some embodiments and situations, one or more users of ILMM client computing devices 105 may further interact over the network(s) 170 with the ILMM system 140, such as to assist with some of the automated operations of the ILMM system for determining the acquisition location of an image based at least in part on an analysis of the image's contents, and/or for subsequently using the determined image acquisition location information in one or more further automated manners. Additional details related to the automated operation of the ILMM system are included elsewhere herein, including with respect to FIGS. 2D-2G and FIG. 6. In some embodiments, the ICA system 160 and/or MIGM system 160 and/or ILMM system 140 may execute on the same server computing system(s), such as if multiple or all of those systems are operated by a single entity or are otherwise executed in coordination with each other (e.g., with some or all functionality of those systems integrated together into a larger system), while in other embodiments the ILMM system may instead obtain floor plan information and/or additional images from one or more external sources and optionally store them locally (not shown) with the ILMM system for further analysis and use.

One or more users (not shown) of one or more client computing devices 175 may further interact over one or more computer networks 170 with the ILMM system 140 and optionally the ICA system 160 and/or MIGM system 160, such as to assist in determining acquisition locations of one or more images and obtaining corresponding determined acquisition location information, and/or to obtain and optionally interact with a generated floor plan on which one or more additional images have been located, and/or to obtain and optionally interact with additional information such as one or more associated images (e.g., to change between a floor plan view and a view of a particular image at an acquisition location within or near the floor plan; to change the horizontal and/or vertical viewing direction from which a corresponding view of a panorama image is displayed, such as to determine a portion of a panorama image to which a current user viewing direction is directed, etc.).

In addition, while not illustrated in FIG. 1A, a floor plan (or portion of it) may be linked to or otherwise associated with one or more other types of information, including for a floor plan of a multi-story or otherwise multi-level building to have multiple associated sub-floor plans for different stories or levels that are interlinked (e.g., via connecting stairway passages), for a two-dimensional ("2D") floor plan of a building to be linked to or otherwise associated with a three-dimensional ("3D") rendering of the building, etc. In addition, while not illustrated in FIG. 1A, in some embodiments the client computing devices 175 (or other devices, not shown), may receive and use determined image acquisition location information (optionally in combination with generated floor plans and/or other generated mapping-related information) in additional manners, such as to control or assist automated navigation activities by those devices (e.g., by autonomous vehicles or other devices), whether instead of or in addition to display of the generated information.

In the depicted computing environment of FIG. 1A, the network 170 may be one or more publicly accessible linked networks, possibly operated by various distinct parties, such as the Internet. In other implementations, the network 170 may have other forms. For example, the network 170 may instead be a private network, such as a corporate or university network that is wholly or partially inaccessible to non-privileged users. In still other implementations, the network 170 may include both private and public networks, with one or more of the private networks having access to and/or from one or more of the public networks. Furthermore, the network 170 may include various types of wired and/or wireless networks in various situations. In addition, the client computing devices 175 and server computing systems 180 may include various hardware components and stored information, as discussed in greater detail below with respect to FIG. 3.

In the example of FIG. 1A, ICA system 160 may perform automated operations involved in generating multiple panorama images (e.g., each a 360 degree panorama around a vertical axis) at multiple associated acquisition locations (e.g., in multiple rooms or other locations within a building or other structure and optionally around some or all of the exterior of the building or other structure), such as for use in generating and providing a representation of an interior of the building or other structure. The techniques may further include analyzing information to determine relative positions/directions between each of two or more acquisition locations, creating inter-panorama positional/directional links in the panoramas to each of one or more other panoramas based on such determined positions/directions, and then providing information to display or otherwise present multiple linked panorama images for the various acquisition locations within the house. Additional details related to embodiments of a system providing at least some such functionality of an ICA system are included in co-pending U.S. Non-Provisional patent application Ser. No. 16/693,286, filed Nov. 23, 2019 and entitled "Connecting And Using Building Data Acquired From Mobile Devices" (which includes disclosure of an example BICA system that is generally directed to obtaining and using panorama images from within one or more buildings or other structures); in U.S. Non-Provisional patent application Ser. No. 16/236,187, filed Dec. 28, 2018 and entitled "Automated Control Of Image Acquisition Via Use Of Acquisition Device Sensors" (which includes disclosure of an example ICA system that is generally directed to obtaining and using panorama images from within one or more buildings or other structures); and in U.S. Non-Provisional patent application Ser. No. 16/190,162, filed Nov. 14, 2018 and entitled "Automated Mapping Information Generation From Interconnected Images"; each of which is incorporated herein by reference in its entirety.

FIG. 1B depicts a block diagram of an exemplary building interior environment in which linked panorama images have been generated and are ready for use to generate and provide a corresponding building floor plan, as well as for use in presenting the linked panorama images to users. In particular, FIG. 1B includes a building 198 with an interior that was captured at least in part via multiple panorama images, such as by a user (not shown) carrying a mobile device 185 with image acquisition capabilities through the building interior to a sequence of multiple acquisition locations 210. An embodiment of the ICA system (e.g., ICA system 160 on server computing system(s) 180; a copy of some or all of the ICA system executing on the user's mobile device, such as ICA application system 155 executing in memory 152 on device 185; etc.) may automatically perform or assist in the capturing of the data representing the building interior, as well as further analyze the captured data to generate linked panorama images providing a visual representation of the building interior. While the mobile device of the user may include various hardware components, such as a camera or other imaging system 135, one or more sensors 148 (e.g., a gyroscope 148a, an accelerometer 148b, a compass 148c, etc., such as part of one or more IMUs, or inertial measurement units, of the mobile device; an altimeter; light detector; etc.), a GPS receiver, one or more hardware processors 132, memory 152, a display 142, a microphone, etc., the mobile device may not in at least some embodiments have access to or use equipment to measure the depth of objects in the building relative to a location of the mobile device, such that relationships between different panorama images and their acquisition locations may be determined in part or in whole based on matching elements in different images and/or by using information from other of the listed hardware components, but without using any data from any such depth sensors. In addition, while directional indicator 109 is provided for reference of the viewer, the mobile device and/or ICA system may not use such absolute directional information in at least some embodiments, such as to instead determine relative directions and distances between panorama images 210 without regard to actual geographical positions or directions.

In operation, a user associated with the mobile device arrives at a first acquisition location 210A within a first room of the building interior (in this example, an entryway from an external door 190-1 to the living room), and captures a view of a portion of the building interior that is visible from that acquisition location 210A (e.g., some or all of the first room, and optionally small portions of one or more other adjacent or nearby rooms, such as through doors, halls, stairs or other connecting passages from the first room) as the mobile device is rotated around a vertical axis at the first acquisition location (e.g., with the user turning his or her body in a circle while holding the mobile device stationary relative to the user's body). The actions of the user and/or the mobile device may be controlled or facilitated via use of one or more programs executing on the mobile device, such as ICA application system 155, optional browser 162, control system 147, etc., and the view capture may be performed by recording a video and/or taking a succession of one or more images, including to capture visual information depicting a number of objects or other elements (e.g., structural details) that may be visible in images (e.g., video frames) captured from the acquisition location. In the example of FIG. 1B, such objects or other elements include various elements that are structurally part of the walls (or "wall elements"), such as the doorways 190 and 197 and their doors (e.g., with swinging and/or sliding doors), windows 196, inter-wall borders (e.g., corners or edges) 195 (including corner 195-1 in the northwest corner of the building 198, and corner 195-2 in the northeast corner of the first room)—in addition, such objects or other elements in the example of FIG. 1B may further include other elements within the rooms, such as furniture 191-193 (e.g., a couch 191; chairs 192; tables 193; etc.), pictures or paintings or televisions or other objects 194 (such as 194-1 and 194-2) hung on walls, light fixtures, etc. The user may also optionally provide a textual or auditory identifier to be associated with an acquisition location, such as "entry" for acquisition location 210A or "living room" for acquisition location 210B, while in other embodiments the ICA system may automatically generate such identifiers (e.g., by automatically analyzing video and/or other recorded information for a building to perform a corresponding automated determination, such as by using machine learning) or the identifiers may not be used.

After the first acquisition location 210A has been adequately captured (e.g., by a full rotation of the mobile device), the user may proceed to a next acquisition location (such as acquisition location 210B), optionally recording movement data during movement between the acquisition locations, such as video and/or other data from the hardware components (e.g., from one or more IMUs, from the camera, etc.). At the next acquisition location, the user may similarly use the mobile device to capture one or more images from that acquisition location. This process may repeat from some or all rooms of the building and optionally external to the building, as illustrated for acquisition locations 210C-210J. The acquired video and/or other images for each acquisition location are further analyzed to generate a panorama image for each of acquisition locations 210A-210J, including in some embodiments to match objects and other elements in different images. In addition to generating such panorama images, further analysis may be performed in order to 'link' at least some of the panoramas together (with some corresponding lines 215 between them being shown for the sake of illustration), such as to determine relative positional information between pairs of acquisition locations that are visible to each other, to store corresponding inter-panorama links (e.g., links 215-AB, 215-BC and 215-AC between acquisition locations A and B, B and C, and A and C, respectively), and in some embodiments and situations to further link at least some acquisition locations that are not visible to each other (e.g., a link 215-BE, not shown, between acquisition locations 210B and 210E).

Additional details related to embodiments of generating and using linking information between panorama images, including using travel path information and/or elements or other features visible in multiple images, are included in co-pending U.S. Non-Provisional patent application Ser. No. 16/693,286, filed Nov. 23, 2019 and entitled "Connecting And Using Building Data Acquired From Mobile Devices" (which includes disclosure of an example BICA system that is generally directed to obtaining and using linking information to inter-connect multiple panorama images captured within one or more buildings or other structures), which is incorporated herein by reference in its entirety.

Various details are provided with respect to FIGS. 1A-1B, but it will be appreciated that the provided details are non-exclusive examples included for illustrative purposes, and other embodiments may be performed in other manners without some or all such details.

FIGS. 2A-2G illustrate examples of automatically generating and presenting information on a floor plan for a building based on one or more images taken in the building interior, such as for the building 198 discussed in FIG. 1B.

In particular, FIG. 2A illustrates an example image 250a, such as a non-panorama perspective image taken in a northeasterly direction from acquisition location 210B in the living room of house 198 of FIG. 1B (or a northeasterly facing subset view of a 360-degree panorama image taken from that acquisition location and formatted in a rectilinear manner)—the directional indicator 109a is further displayed in this example to illustrate the northeasterly direction in which the image is taken. In the illustrated example, the displayed image includes built-in elements (e.g., light fixture 130a), furniture (e.g., chair 192-1), two windows 196-1, and a picture 194-1 hanging on the north wall of the living room. No inter-room passages into or out of the living room (e.g., doors or other wall openings) are visible in this image. However, multiple room borders are visible in the image 250a, including horizontal borders between a visible portion of the north wall of the living room and the living room's ceiling and floor, horizontal borders between a visible portion of the east wall of the living room and the living room's ceiling and floor, and the inter-wall vertical border 195-2 between the north and east walls.

Figure 2B:
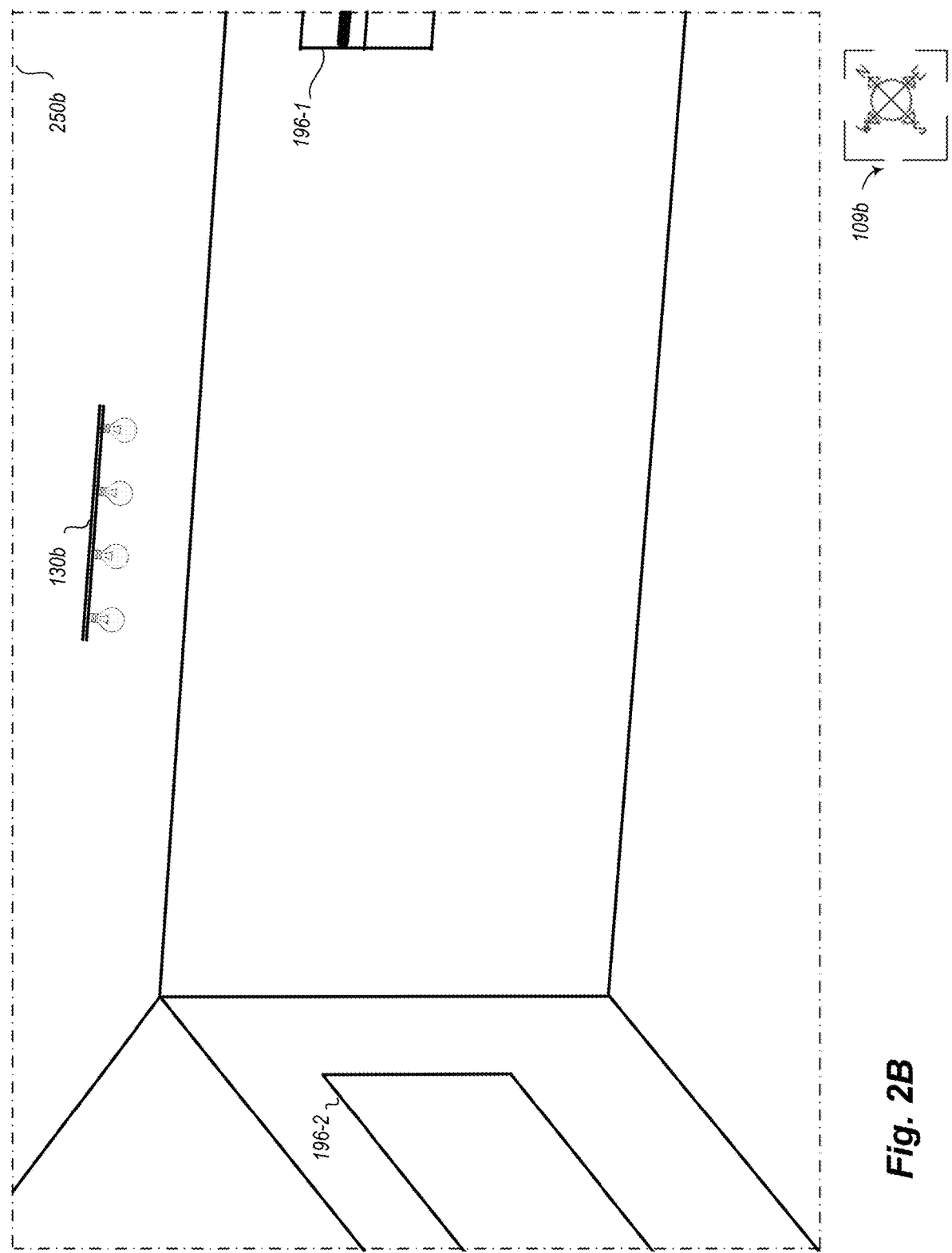

FIG. 2B continues the example of FIG. 2A, and illustrates an additional perspective image 250b taken in a northwesterly direction from acquisition location 210B in the living room of house 198 of FIG. 1B—the directional indicator 109b is further displayed to illustrate the northwesterly direction in which the image is taken. In this example image, a small portion of one of the windows 196-1 continues to be visible, along with a portion of window 196-2 and a new lighting fixture 130b. In addition, horizontal and vertical room borders are visible in image 250b in a manner similar to that of FIG. 2A.

Figure 2C:
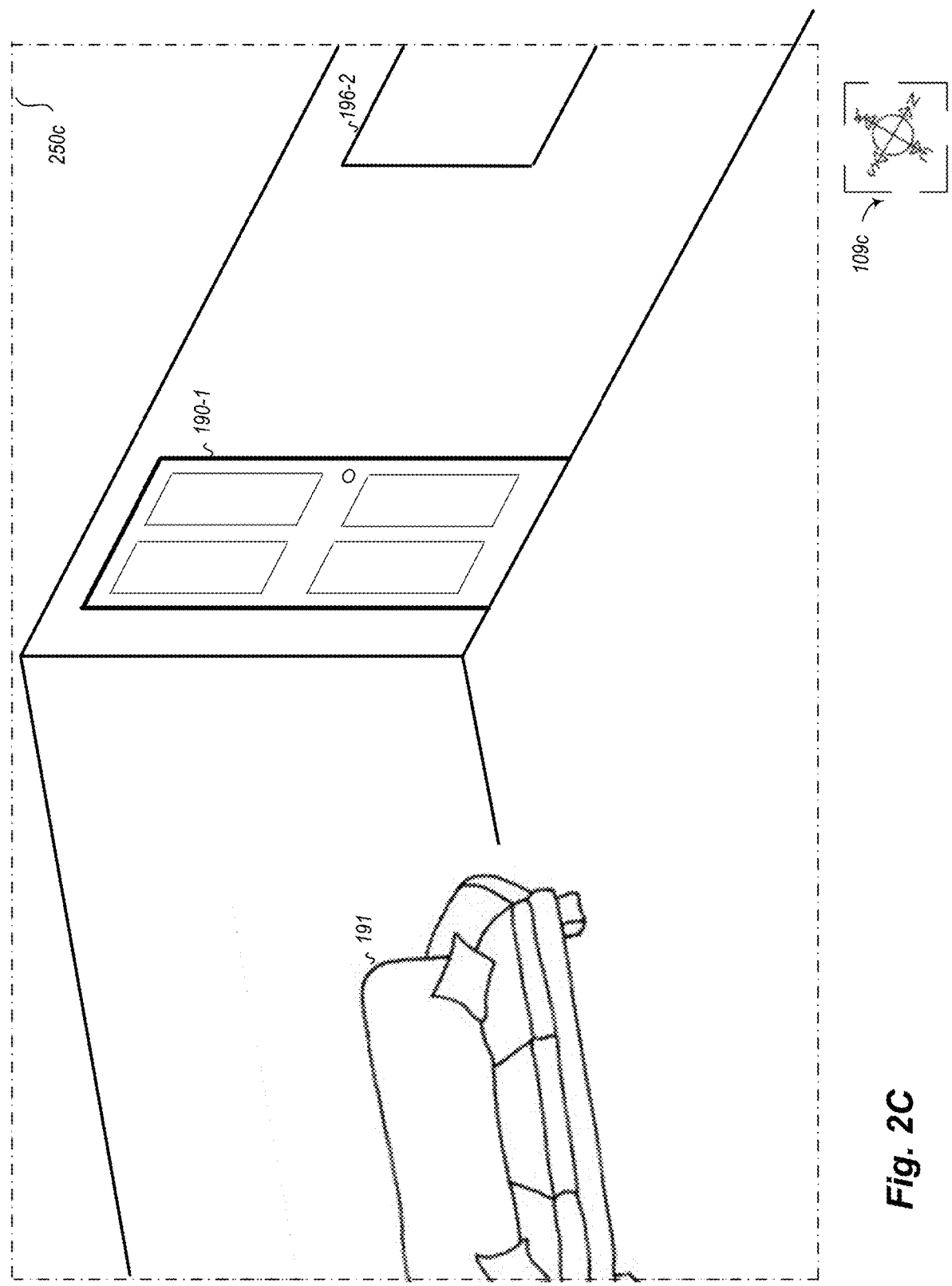

FIG. 2C continues the examples of FIGS. 2A-2B, and illustrates a third perspective image 250c taken in a southwesterly direction in the living room of house 198 of FIG. 1B, such as from acquisition location 210B—the directional indicator 109c is further displayed to illustrate the southwesterly direction in which the image is taken. In this example image, a portion of window 196-2 continues to be visible, as is a couch 191 and visual horizontal and vertical room borders in a manner similar to that of FIGS. 2A and 2B. This example image further illustrates an inter-room passage for the living room, which in this example is a door 190-1 to enter and leave the living room (which FIG. 1B identifies as a door to the exterior of the house). It will be appreciated that a variety of other perspective images may be taken from acquisition location 210B and/or other acquisition locations and displayed in a similar manner.

Figure 2D:
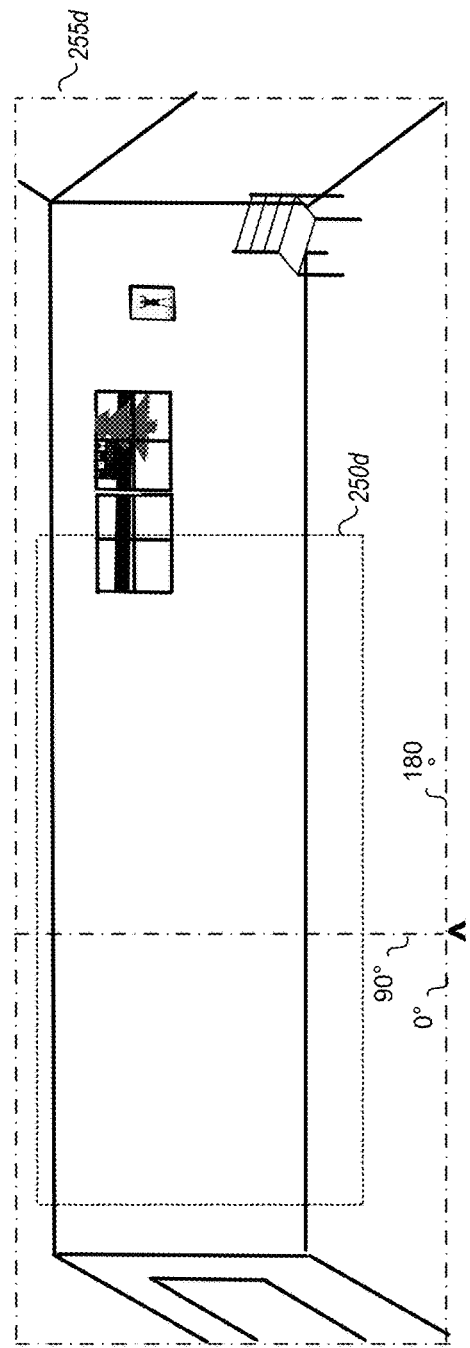
Figure 2D:
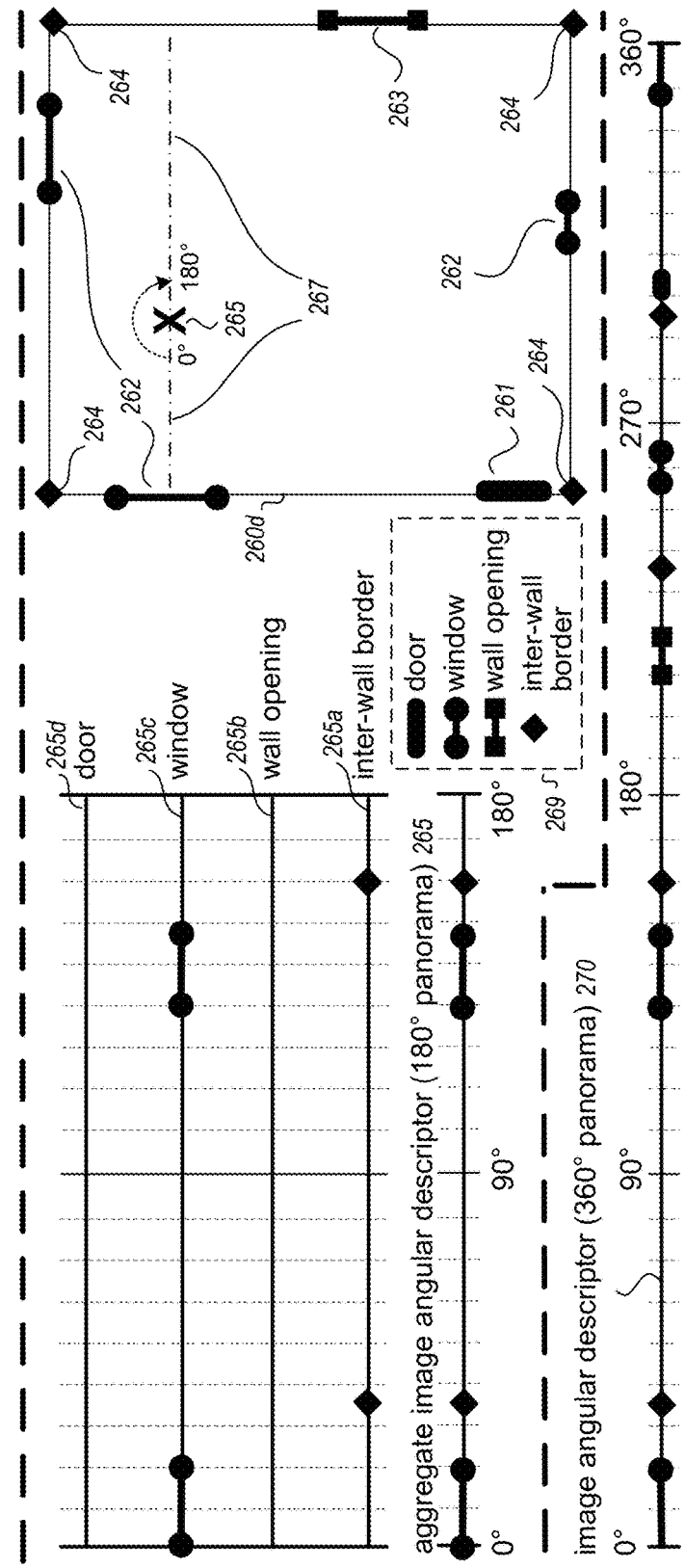

FIG. 2D continues the examples of FIGS. 2A-2C, and illustrates a panorama image 255d that is acquired separately from the images of FIG. 1B (with the images of FIG. 1B being captured at the acquisition locations 210 for use in generating a floor plan for the building 198)—panorama image 255d is acquired in this example at a time after the generation of the floor plan for building 198, and for use in associating the panorama image 255d with a position on a floor plan for the building 198 that corresponds to the acquisition location of the panorama image 255d. In this example, the panorama image 255d is a 180° panorama image taken from acquisition location 265 in the living room, as shown using information 265 and 267 on the floor plan excerpt 260d corresponding to the living room (additional details related to an example display of a floor plan for the building 198 are discussed with respect to FIG. 2G and elsewhere herein). Using such a panorama image 255d, various subsets of the panorama image may be displayed to an end user (not shown) in a manner similar to that of perspective images 250a-250b of FIGS. 2A-2B, with an example subset 250d shown as part of the panorama image 255d—while not separately shown on panorama image 255d, a subset portion of it that corresponds to the first perspective image 250a is available in a right portion of the panorama image 255d, while a left subset portion of the panorama image 255d contains visual data corresponding to that of the perspective image 250b. Since the panorama image 255d does not extend to a full 360° horizontal degrees in this example, a subset portion of it corresponding to perspective image 250c is not available, but if a 360° panorama image was instead acquired from acquisition location 265 (as discussed further below with respect to image angular descriptor 270), such a 360° panorama image would include a subset portion with visual information similar to that of perspective image 250c.

Visual contents of the panorama image 255d may be analyzed in order to determine the position of the image's acquisition location 265 in the living room, and to optionally further determine orientation/direction information for the panorama image. For the purposes of this example, the panorama image 255d is captured in the living room of the house and includes 180° of horizontal coverage around a vertical axis (e.g., a half circle showing approximately the northern quarter of the living room), and with the x and y axes of the image's visual contents being aligned with corresponding horizontal and vertical information in the room (e.g., the border between two walls, the border between a wall and the floor, the bottoms and/or tops of windows and doors, etc.). In this example, the image capture begins with a camera orientation in a western direction, corresponding to a relative starting horizontal direction of 0° for the panorama image 255d, and continues in a half circle, with a relative 90° horizontal direction for this panorama image then corresponding to the northern direction, and a relative 180° horizontal direction for this panorama image corresponding to the eastern direction. If a full 360° panorama image had instead been captured from that same starting direction, it would include the same directional information as noted above for the 180° panorama image, and would further include a relative 270° horizontal direction for the 360° panorama image corresponding to the southern direction, and a relative 360° ending horizontal direction for the 360° panorama image being back to the western direction.

FIG. 2D further illustrates angular information 265 for the panorama image 255d that may be determined by the ILMM system and used to identify the positions of various types of wall elements of the living room that are shown in the panorama image 255d. In this example, the wall elements include doors, windows, inter-room wall openings, and inter-wall borders, with corresponding visual identifiers shown in key 269, and the floor plan excerpt 260d similarly illustrating locations of such types of wall elements for the living room (including door 261, windows 262, inter-room wall opening 263, and inter-wall borders 264)—it will be appreciated that other types of elements in the room may instead be used for image analysis, and that information about such elements may be displayed on a floor plan in a variety of manners. While the positions of the wall elements in the panorama image and/or the locations of those wall elements in the living room may be automatically determined in some embodiments based on analysis of one or more images taken in the living room, in other embodiments at least some such information may instead be determined in other manners, such as to be specified by one or more human operators of the ILMM system or of an associated system.

With respect to the angular information 265 for the panorama image 255d, it includes an information subset 265a that illustrates the determined angular positions of inter-wall border elements in the panorama image 255d, with a first inter-wall border element (corresponding to the northwest corner of the living room) being visible in the panorama image 255d at approximately 35° (relative to the westward starting direction of 0° for the panorama image), and with a second inter-wall border element (corresponding to the northeast corner of the living room) being visible in the panorama image 255d at approximately 160° (also relative to the starting direction for the panorama image). Similarly, information subset 265c illustrates the determined angular positions of the windows on the west and north walls of the living room in the panorama image 255d, with a portion of the west window being visible from 0° to approximately 20° of the panorama image 255d, and the north window being visible from approximately 130° to just under 150° (both relative to the starting direction for the panorama image). Thus, while some wall elements (such as inter-wall borders) may be represented at a singular angular degree, other wall elements (such as windows, doors, openings, etc.) may instead be represented across a range of angular degree positions. As shown in information subsets 265b and 265d corresponding to wall openings and doors, respectively, the door in the living room and the wall opening in the living room are not visible in panorama image 255d, and thus no corresponding angular position information is identified for those types of wall elements in this example. The various angular position information subsets 265a-265d are combined in this example to create an aggregate image angular descriptor 265 for the panorama image 255d, using the same visual identifiers for different types of wall elements for the purpose of illustration, although the information may be encoded and stored in other formats (e.g., using textual labels, numeric identifiers associated with corresponding wall element types, etc.)—in addition, such an image angular descriptor 265 may include information for some or all angles of the image (e.g., in this example, a vector with 181 values, corresponding to a separate value for each of the angles 0° to 180°).

An additional image angular descriptor 270 is shown in FIG. 2D that is similar to descriptor 265, but corresponds to a situation in which the panorama image being analyzed instead has coverage of 360° from the acquisition location 265, with the first half of the descriptor 270 (i.e. the first 180° of angular information) being the same as descriptor 265, and with the descriptor 270 further including an additional 180° of angular information corresponding to the remainder of the living room. Accordingly, descriptor 270 includes further information about determined angular positions of the door 261 and the wall opening 263, as well as the window in the south wall and the inter-wall borders in the southeast and southwest corners of the living room—furthermore, since all of the west window is now visible in the 360° of horizontal coverage, the additional portion of the west window is now represented with corresponding positional information from approximately 350° to 360° in the descriptor 270.

As previously noted, information about the determined positions of identified elements in an angular descriptor may be encoded and stored in various manners in various embodiments, including in a vector having one or more values for each angular degree of direction, such as to identify each wall element present in a given angular direction—in other embodiments, other angular information than single horizontal degrees may be represented in the image angular descriptor, such as less than a single degree or instead multiple degrees, and/or to represent vertical degrees (whether instead of or in addition to horizontal degrees). While not illustrated in these examples, it will be appreciated that multiple wall elements may be visible in the same angular direction from a particular room location in some situations—if so, the angular position information in the corresponding angular descriptor for that single angular direction may be represented in various ways in various embodiments, such as to include indications of each type of visible wall element, or instead to indicate only one or a subset of the visible wall elements. It will also be appreciated that many types of wall elements, such as doors and windows, will extend across multiple degrees of horizontal coverage, such as to have the window in the northward direction being visible and identified in the resulting image angular descriptor for several angular degrees. While the panorama images in the examples above were captured with a starting direction of westward, it will be appreciated that panorama images may be captured in other manners in other situations—for example, other panorama images may have different starting directions, or if a panorama image instead had its entire horizontal coverage captured simultaneously (e.g., via one or more fisheye lenses) then a particular direction may be chosen to be treated as a relative 0° for that panorama image (e.g., chosen arbitrarily; by using a predefined direction, such as northward; etc.).

The angular position information for wall elements in a panorama image (or other type of image, such as a perspective image) may further be determined in various manners in various embodiments. For example, in at least some embodiments, the ILMM system may perform automated operations to analyze the visual contents of the image to identify wall elements of one or more defined types, including in some embodiments to use machine learning techniques to identify particular types of wall elements in the visual content information of the image. Similarly, such automated analysis techniques may be used to determine a range of angular information that is covered by the visual contents information of the image (e.g., a range of 180° in panorama image 255d, or a range of 360° in the panorama image associated with image angular descriptor 270), or instead such information may be determined in other manners in other embodiments, such as based at least in part on metadata associated with the image capture. Once a range of angular information is determined for the panorama image, the automated operations may then be further used to determine the particular angle associated with a particular location in the image corresponding to some or all of a particular wall element. In other embodiments, some or all such position information for wall elements and/or angular range information for an image may be determined in other manners, such as to be confirmed by a human operator user of the ILMM system (e.g., via a GUI of the ILMM system, not shown) after an initial position determination is automatically made by the ILMM system, or instead to be fully specified by such a user.

Figure 2E:
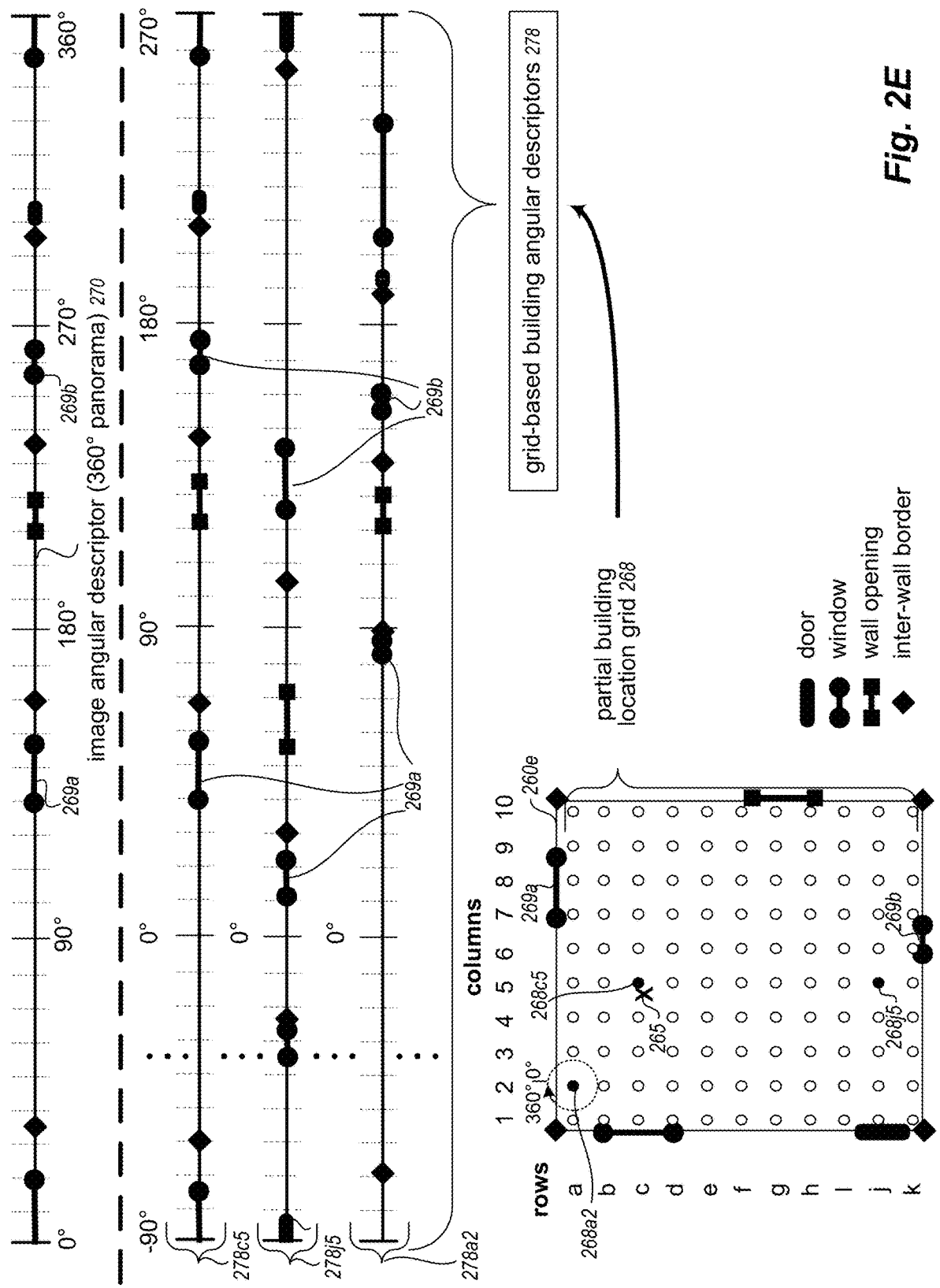

FIG. 2E continues the examples of FIGS. 2A-2D, and includes a copy of image angular descriptor 270 from FIG. 2D for reference purposes. In addition, FIG. 2E further illustrates a variety of additional information related to generating building angular descriptors for a variety of room locations in the living room—while additional building angular descriptors may similarly be generated and used for some or all other rooms of the house (and in some cases for external areas that surround or are otherwise near the house), they are not illustrated in this example for the sake of brevity. In particular, an excerpt 260e of the floor plan for the living room is illustrated (in a manner similar to that of excerpt 260d of FIG. 2D), with the living room floor plan excerpt 260e including a grid 268 of various room locations within the living room (e.g., a part of a larger building location grid, not shown, that extends throughout the house), and further illustrating information 265 to indicate the acquisition location of the 360° panorama image corresponding to image angular descriptor 270—it will be appreciated that the positions within such a grid may be determined in a variety of manners (e.g., based on a defined quantity of rows and/or columns, based on a defined total quantity of room locations, based on a defined horizontal and/or vertical distance between adjacent room locations, etc.), and that a group of room locations may have a form other than a grid in other embodiments (including in some cases to be selected randomly or otherwise in an irregular fashion). In at least some embodiments, a building angular descriptor will be generated for each of the room locations, such as for later use in comparing those building angular descriptors to an image angular descriptor for an image in order to determine which of the building angular descriptors is a best match to that image angular descriptor.

In this example, three illustrative building angular descriptors 278 are shown in FIG. 2E, corresponding to three example room locations in the grid 268—for example, grid location 268c5 is located near location 265, and has a corresponding building angular descriptor 278c5 illustrated. Other example room descriptors that are shown include building angular descriptor 278j5 that corresponds to grid location 268j5 (i.e., in the same column as 268c5, but in a different row), and building angular descriptor 278a2 that corresponds to grid location 268a2. In this example, each of the building angular descriptors uses the northward direction to correspond to 0°, continuing in a clockwise manner for 360°—however, the building angular descriptors 278 are shown in FIG. 2E beginning at a −90° (or 270°) angular direction (corresponding to a westward direction) for illustration purposes, to facilitate a visual comparison of the similarities and dissimilarities of the building angular descriptors to the image angular descriptor 270 for the reader. As is visually apparent, the room descriptor 278c5 (from a room location 268c5 close to that of location 265) is more similar to the image angular descriptor 270 than are the other displayed example building angular descriptors, as would be expected since small changes in room location would typically result in small differences in angular information about wall element positions.

A building angular descriptor for a given room location may be generated in a variety of manners in various embodiments, including by using information that is provided with a corresponding generated floor plan about the position of relevant wall elements on the walls of the floor plan. Given such information, geometric techniques may be used to determine the angular amount from a given room location and starting direction to a given location on a wall, such as a location corresponding to the horizontal beginning or ending of a door, window, or wall opening, or a position of an inter-wall border. For purposes of illustration, the north window is labeled 269a in the living room excerpt 260e, and the south window is labeled 269b, with the corresponding window elements in the image angular descriptor 270 and building angular descriptors 278 being labeled in the same manner to facilitate visual comparison by the reader. In other embodiments, the positions of relevant wall elements on the walls of the floor plan may be determined in other manners (e.g., if they are not provided with the generated floor plan), such as based on input from one or more human operator users of the ILMM system, from blueprints or other schematics for the building, etc.

Figure 2F:
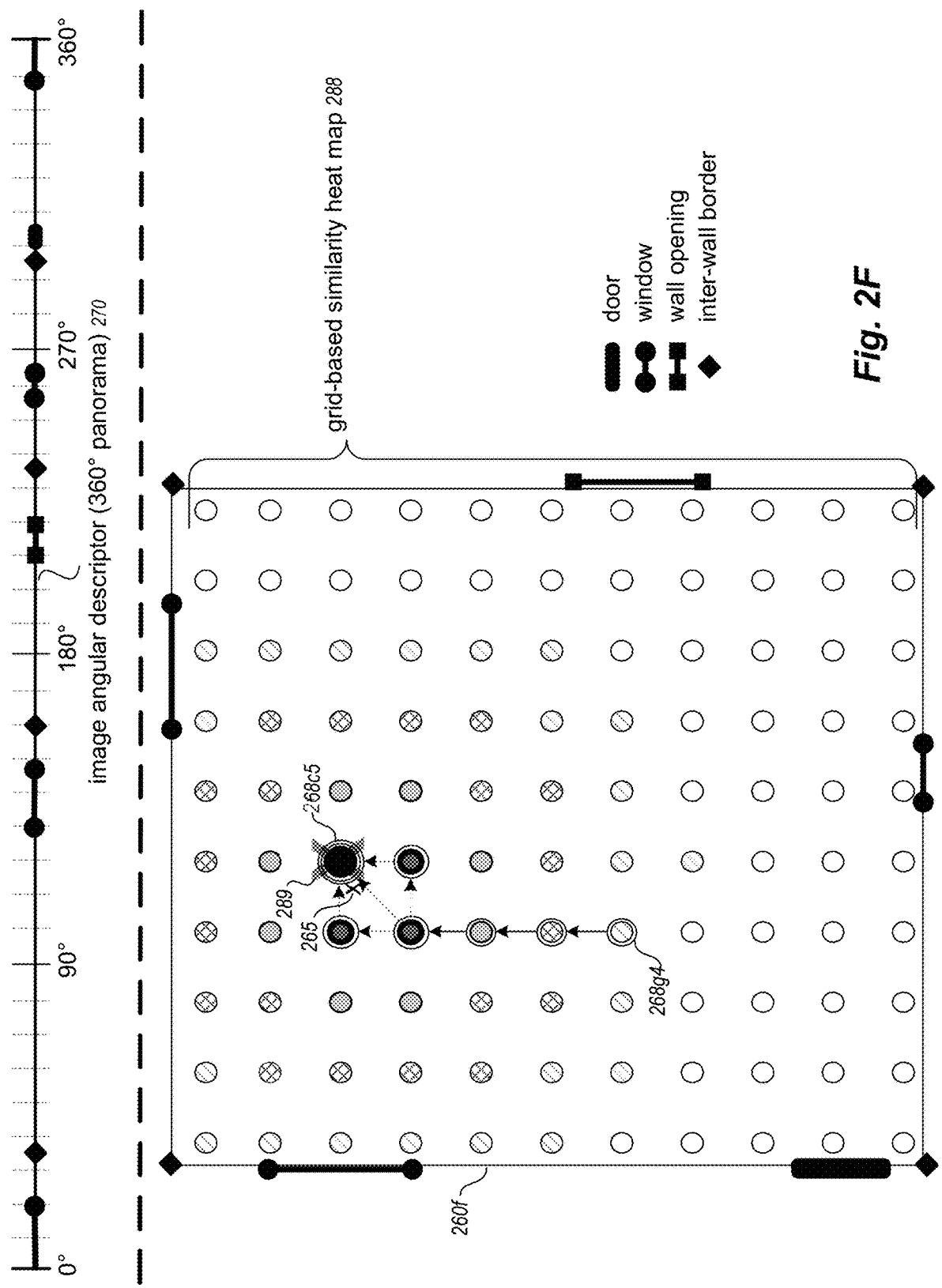
Figure 2G:
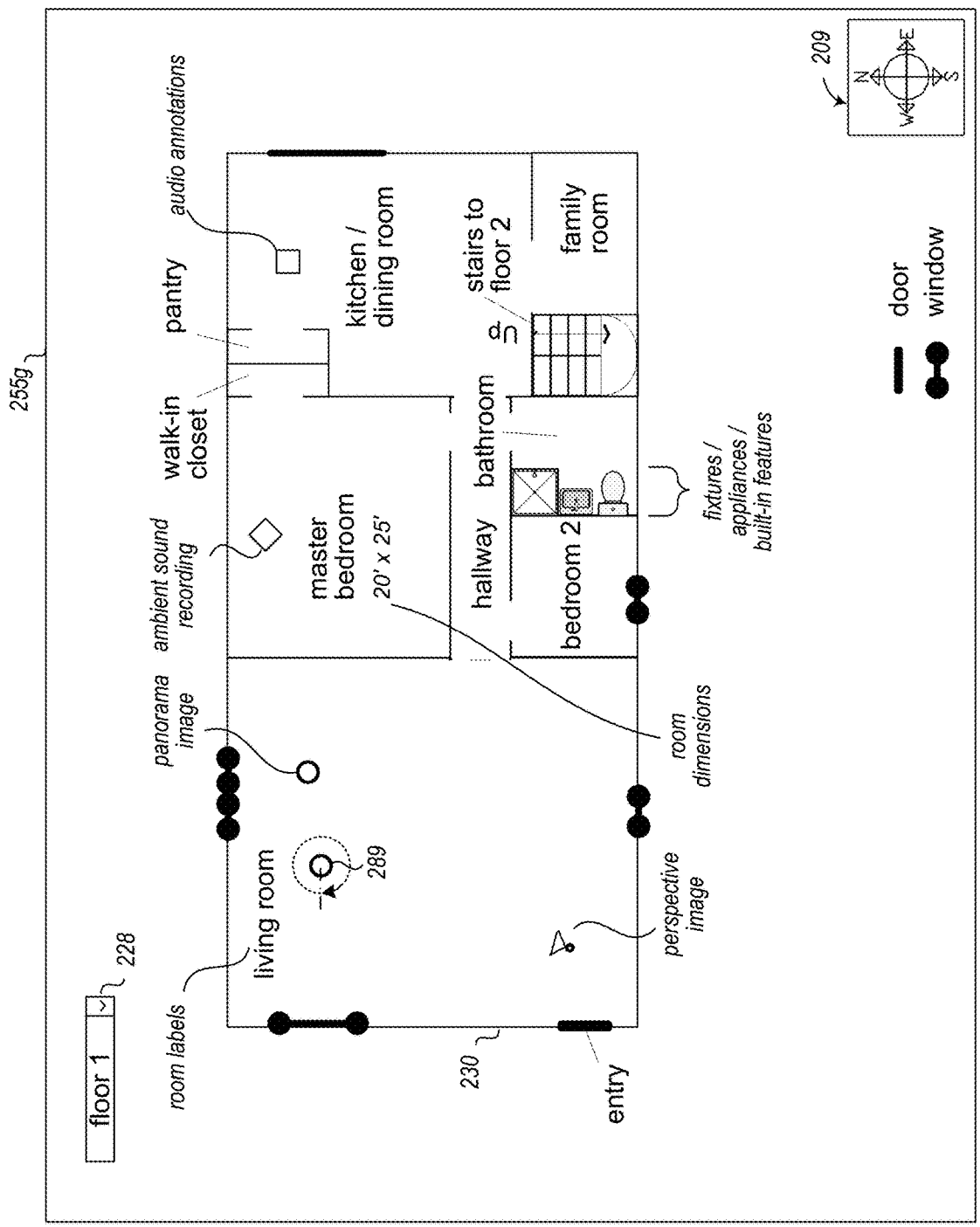

FIG. 2F continues the examples of FIGS. 2A-2E, and includes a copy of image angular descriptor 270 from FIGS. 2D and 2E for reference purposes. In addition, FIG. 2F further illustrates an excerpt 260f of the floor plan for the living room in a manner similar to that of excerpt 260e of FIG. 2E, including to show the room location grid from FIG. 2E, but with the grid 288 in FIG. 2F including additional information about a degree of match of the associated building angular descriptor for each room location to that of image angular descriptor 270 (e.g., in a manner similar to a heat map). In this example, the similarity/dissimilarity information 288 indicates that the grid room location 268c5 has a highest degree of match (e.g., highest degree of similarity, lowest degree of dissimilarity, lowest distance, etc.) to image angular descriptor 270, while the room locations at rows 3 and 4 of column d and at row 4 of column e have the next highest degree of match, and with various other room locations generally decreasing in their degree of match as their distance to room location 268c5 increases. In at least some embodiments, the comparison of the image angular descriptor to the building angular descriptors for the room may include starting at a selected room location (e.g., randomly selected, selected at or near the center of the room, etc.), such as room location 268g4 in this example, and using a nearest neighbor search to repeatedly move in a direction of adjacent room locations with a higher degree of match until a best match is identified, as illustrated in the excerpt 260f for room location 268c5. After the room location with the best match is determined, a corresponding location in the room may be assigned as the determined acquisition location 289 of the 360° panorama image, such as that room location of that best match building angular descriptor in this illustrated example, or in some embodiments to be within a small distance from that room location (e.g., a calculated distance based on an amount and/or type of difference between the image angular descriptor and the best match building angular descriptor). Once the acquisition location 289 of the 360° panorama image is determined, it may be stored with the floor plan and/or otherwise used in one or more manners, as discussed in greater detail elsewhere herein.

While not illustrated in the examples of FIGS. 2D-2F, in some embodiments and situations, an acquisition location determination may be performed for an image that might have been captured in any of multiple candidate rooms in one or more buildings—such acquisition location determination activities may be performed in various manners in various embodiments, such as to consider each possible room and find the best matching room location across all of them, to narrow the group of possible candidate rooms before performing matching (e.g., by attempting to identify one or more elements that are visible in the image but are present in only one or a subset of the possible candidate rooms, etc.). In such embodiments, a grid of angular descriptors for the building may extend throughout some or all rooms of the building, and the corresponding search of a best match for an image's angular descriptor to the building's rooms' angular descriptors may extend across the angular descriptors of multiple rooms (e.g., may include considering all angular descriptors generated for the building).

With respect to finding a best match building angular descriptor for image angular descriptor 270 from multiple possible room locations in the room, some or all of the building angular descriptors for the room locations in the grid may be compared to the image angular descriptor 270 to determine a degree of match in various manners in various embodiments. For example, in some embodiments a circular earthmover's distance metric may be used to compare two such descriptors in a rotation independent manner, such that the two descriptors may have relative 0° starting directions that point in different directions. Other measures of distance or similarity/dissimilarity may be used in other embodiments, such as by measuring the distance for each angular degree and aggregating that information across all of the angular degrees.

In addition, to facilitate a comparison of two such angular descriptors in situations in which the distance or similarity/dissimilarity metric is not rotation-independent, additional automated operations may be performed in some embodiments to ensure that information encoded in a given relative angular direction in one angular descriptor is being compared to a relative angular direction in the other angular descriptor that points in the same actual real-world direction. For example, in some embodiments, a brute force method could be used that compares each angular direction in one angular descriptor to a particular angular direction (e.g., the starting direction) in the other angular descriptor, thus ensuring that one of the comparisons uses the same directions. Alternatively, in other embodiments automated operations may be performed to synchronize the two angular descriptors to be compared, such as by identifying which relative angular directions in one angular descriptor correspond to which relative angular directions in the other angular descriptor (e.g., to identify, for the relative 0° starting angular direction for one angular descriptor, what the corresponding angular direction is in the other angular descriptor). With respect to the example of FIG. 2E, such a determination may identify that the 0° starting direction for the image angular descriptor 270 (which corresponds to a westward direction) is the same as the 270° direction (or −90° direction) in each building angular descriptor 278. Alternatively, in some embodiments a limited number of instances of a characteristic in the environment may be identified, with the angular direction to each such instance for one angular descriptor being compared to a corresponding instance in the other angular descriptor—an example of such a characteristic may be a direction that is orthogonal or normal to the plane of the wall (e.g., identified by doing a vanishing point analysis using lines in the image), such as to have 4 such instances in a typical rectangular room for a 360° panorama image (i.e., one for each wall, which are roughly 90° apart from each other). As another alternative, such a characteristic in the environment may be a type of wall element having only one or a limited number of instances, and the angular direction in one angular descriptor to each such instance may be compared to the angular direction for an instance of the same wall element type in the other angular descriptor—examples of such a characteristic may include a door (e.g., a starting or ending edge of the door), an inter-wall border (e.g., with four such instances typically occurring in a rectangular room), etc. in other embodiments, other distance metrics and/or similarity/dissimilarity metrics may be used, and other techniques may be used to synchronize corresponding information in two or more angular descriptors being compared.

FIG. 2G continues the examples of FIGS. 2A-2F, and illustrates one example 255g of a 2D floor plan for the house 198, such as may be presented to an end user in a GUI, with the living room being the most westward room of the house (as reflected by directional indicator 209)—it will be appreciated that a 3D or 2.5D floor plan showing wall height information may be similarly generated and displayed in some embodiments, whether in addition to or instead of such a 2D floor plan. In this example, information 289 has been added to the floor plan 255g to represent a position of the determined acquisition location for the 360° panorama image discussed with respect to FIGS. 2D-2F, including to show orientation/direction information for the panorama image (e.g., to illustrate that the panorama covers 360°, and has a starting/ending direction in the westward direction). In other embodiments and situations, position information for an image may be displayed in other manners, such as for the example perspective image in the southwest side of the living room that includes visual indicators of the directions covered in the perspective image, and/or for the additional panorama image in the northeast corner of the living room that shows an acquisition location in the room without showing orientation/direction information for that panorama image. When displayed as part of a GUI, the added information 289 for the 360° panorama image on the displayed floor plan may be a user-selectable control (or be associated with such a control) that allows an end user to select and display some or all of the associated 360° panorama image (e.g., in a manner similar to that of FIGS. 2A-2D).

Various other types of information are also illustrated on the 2D floor plan 255g in this example. For example, such other types of information may include one or more of the following: room labels added to some or all rooms (e.g., "living room" for the living room); room dimensions added for some or all rooms; visual indications of fixtures or appliances or other built-in features added for some or all rooms; visual indications added for some or all rooms of positions of additional types of associated and linked information (e.g., of other panorama images and/or perspective images that an end user may select for further display, of audio annotations and/or sound recordings that an end user may select for further presentation, etc.); visual indications added for some or all rooms of doors and windows; etc. In addition, in this example a user-selectable control 228 is added to indicate a current floor that is displayed for the floor plan, and to allow the end user to select a different floor to be displayed—in some embodiments, a change in floors or other levels may also be made directly from the floor plan, such as via selection of a corresponding connecting passage in the illustrated floor plan (e.g., the stairs to floor 2). It will be appreciated that a variety of other types of information may be added in some embodiments, that some of the illustrated types of information may not be provided in some embodiments, and that visual indications of and user selections of linked and associated information may be displayed and selected in other manners in other embodiments.

Additional details related to embodiments of a system providing at least some such functionality of an MIGM system or related system for generating floor plans and associated information and/or presenting floor plans and associated information are included in co-pending U.S. Non-Provisional patent application Ser. No. 16/190,162, filed Nov. 14, 2018 and entitled "Automated Mapping Information Generation From Inter-Connected Images" (which includes disclosure of an example Floor Map Generation Manager, or FMGM, system that is generally directed to automated operations for generating and displaying a floor map or other floor plan of a building using images acquired in and around the building); in U.S. Non-Provisional patent application Ser. No. 16/681,787, filed Nov. 12, 2019 and entitled "Presenting Integrated Building Information Using Three-Dimensional Building Models" (which includes disclosure of an example FMGM system that is generally directed to automated operations for displaying a floor map or other floor plan of a building and associated information); in U.S. Non-Provisional patent application Ser. No. 16/841,581, filed Apr. 6, 2020 and entitled "Providing Simulated Lighting Information For Three-Dimensional Building Models" (which includes disclosure of an example FMGM system that is generally directed to automated operations for displaying a floor map or other floor plan of a building and associated information); in U.S. Provisional Patent Application No. 62/927,032, filed Oct. 28, 2019 and entitled "Generating Floor Maps For Buildings From Automated Analysis Of Video Of The Buildings' Interiors" (which includes disclosure of an example Video-To-Floor Map, or VTFM, system that is generally directed to automated operations for generating a floor map or other floor plan of a building using video data acquired in and around the building); and in U.S. Non-Provisional patent application Ser. No. 16/807,135, filed Mar. 2, 2020 and entitled "Automated Tools For Generating Mapping Information For Buildings" (which includes disclosure of an example MIGM system that is generally directed to automated operations for generating a floor map or other floor plan of a building using images acquired in and around the building); each of which is incorporated herein by reference in its entirety.

Various details have been provided with respect to FIGS. 2A-2G, but it will be appreciated that the provided details are non-exclusive examples included for illustrative purposes, and other embodiments may be performed in other manners without some or all such details.

Figure 3:
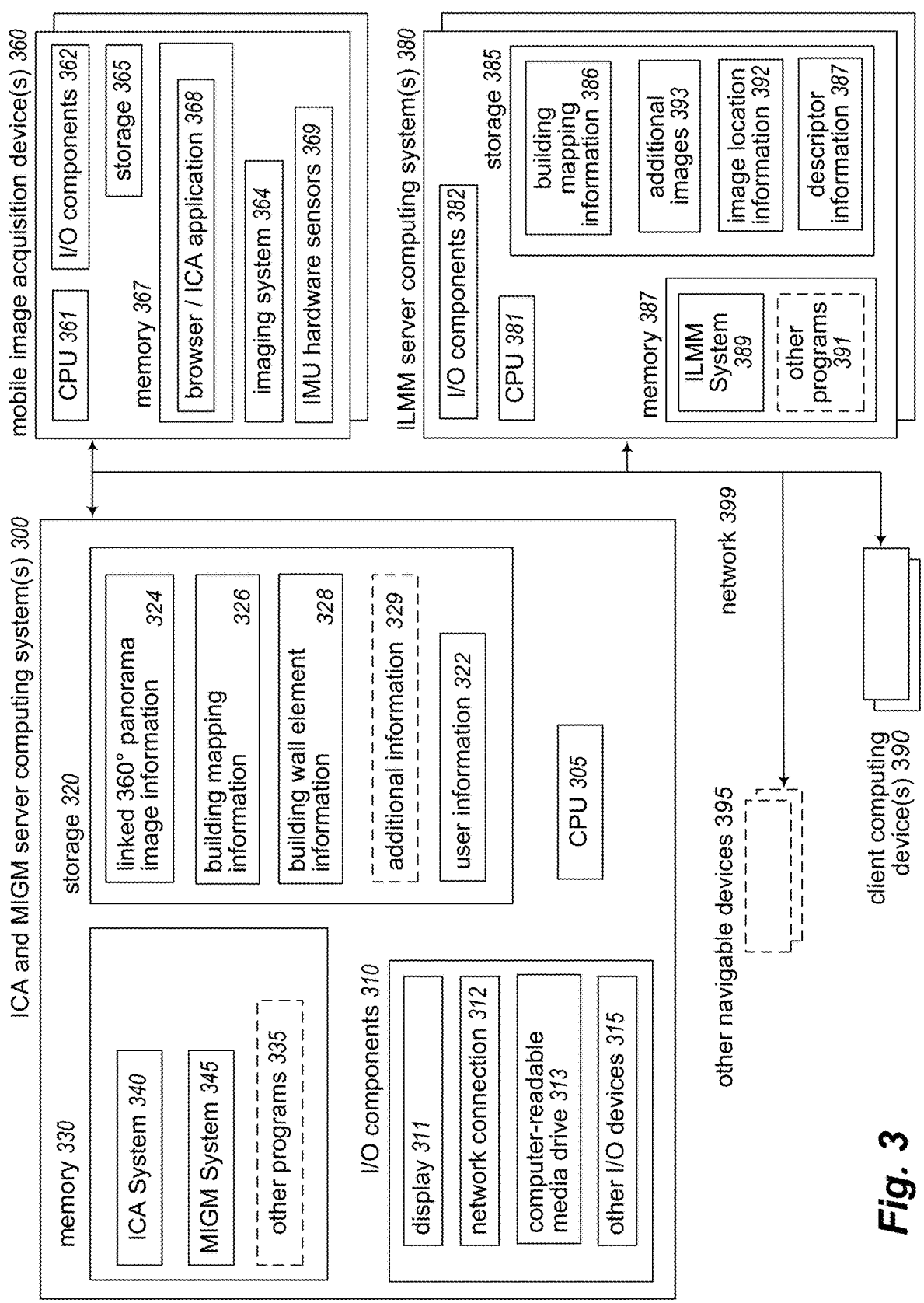
FIG. 3 is a block diagram illustrating a computing system suitable for executing an embodiment of a system that performs at least some of the techniques described in the present disclosure.

FIG. 3 is a block diagram illustrating an embodiment of one or more server computing systems 380 executing an implementation of an ILMM system 380, and one or more server computing systems 300 executing an implementation of an ICA system 340 and an MIGM system 345—the server computing system(s) and ILMM system may be implemented using a plurality of hardware components that form electronic circuits suitable for and configured to, when in combined operation, perform at least some of the techniques described herein. In the illustrated embodiment, each server computing system 300 includes one or more hardware central processing units ("CPU") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.). Each server computing system 380 may include hardware components similar to those of a server computing system 340, including one or more hardware CPU processors 382, various I/O components 382, storage 385 and memory 387, but with some of the details of server 340 being omitted in server 380 for the sake of brevity.

The server computing system(s) 380 and executing ILMM system 340 may communicate with other computing systems and devices via one or more networks 399 (e.g., the Internet, one or more cellular telephone networks, etc.), such as user client computing devices 390 (e.g., used to view floor plans, associated images and/or other related information), ICA and MIGM server computing system(s) 300, one or more mobile image acquisition devices 360, optionally other navigable devices 395 that receive and use floor plans and determined image acquisition locations and optionally other generated information for navigation purposes (e.g., for use by semi-autonomous or fully autonomous vehicles or other devices), and optionally other computing systems that are not shown (e.g., used to store and provide additional information related to buildings; used to capture building interior data; used to store and provide information to client computing devices, such as additional supplemental information associated with images and their encompassing buildings or other surrounding environment; etc.).

In the illustrated embodiment, an embodiment of the ILMM system 389 executes in memory 387 in order to perform at least some of the described techniques, such as by using the processor(s) 381 to execute software instructions of the system 389 in a manner that configures the processor(s) 381 and computing system 380 to perform automated operations that implement those described techniques. The illustrated embodiment of the ILMM system may include one or more components, not shown, to each perform portions of the functionality of the ILMM system, and the memory may further optionally execute one or more other programs 391—as one specific example, copies of the ICA and/or MIGM systems may execute as one of the other programs 391 in at least some embodiments, such as instead of or in addition to the ICA system 340 and MIGM system 345 on the server computing system(s) 300. The ILMM system 389 may further, during its operation, store and/or retrieve various types of data on storage 385 (e.g., in one or more databases or other data structures), such as various types of floor plan information and other building mapping information 386 (e.g., generated and saved 2D floor plans and positions of wall elements and other elements on those floor plans, generated and saved 2.5D and/or 3D models, building and room dimensions for use with associated floor plans, additional images and/or annotation information, etc.), information 393 about additional images whose acquisition locations are to be determined and associated information 392 about such determined acquisition locations, information 387 about generated building angular descriptors and image angular descriptors, and optionally various other types of information (e.g., linked panorama information). The ICA system 340 and/or MIGM system 345 may similarly store and/or retrieve various types of data on storage 320 (e.g., in one or more databases or other data structures) during their operation and provide some or all such information to the ILMM system 389 for its use (whether in a push and/or pull manner), such as various types of floor plan information and other building mapping information 326 (e.g., similar to or the same as information 386), various types of user information 322, acquired 360° panorama image information 324 (e.g., for analysis to generate floor plans; to provide to users of client computing devices 390 for display; etc.), and/or various types of optional additional information 328 (e.g., various analytical information related to presentation or other use of one or more building interiors or other environments captured by an ICA system).

Some or all of the user client computing devices 390 (e.g., mobile devices), mobile image acquisition devices 360, other navigable devices 395 and other computing systems may similarly include some or all of the same types of components illustrated for server computing systems 300 and 380. As one non-limiting example, the mobile image acquisition devices 360 are each shown to include one or more hardware CPU(s) 361, I/O components 362, storage 365, imaging system 364, IMU hardware sensors 369, and memory 367, with one or both of a browser 368 and one or more client applications 369 (e.g., an application specific to the ILMM system and/or ICA system) executing within memory 367, such as to participate in communication with the ILMM system 389, ICA system 340 and/or other computing systems. While particular components are not illustrated for the other navigable devices 395 or client computing systems 390, it will be appreciated that they may include similar and/or additional components.

It will also be appreciated that computing systems 300 and 380 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated ILMM system 389 may in some embodiments be distributed in various components, some of the described functionality of the ILMM system 389 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the ILMM system 389 executing on server computing systems 380) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
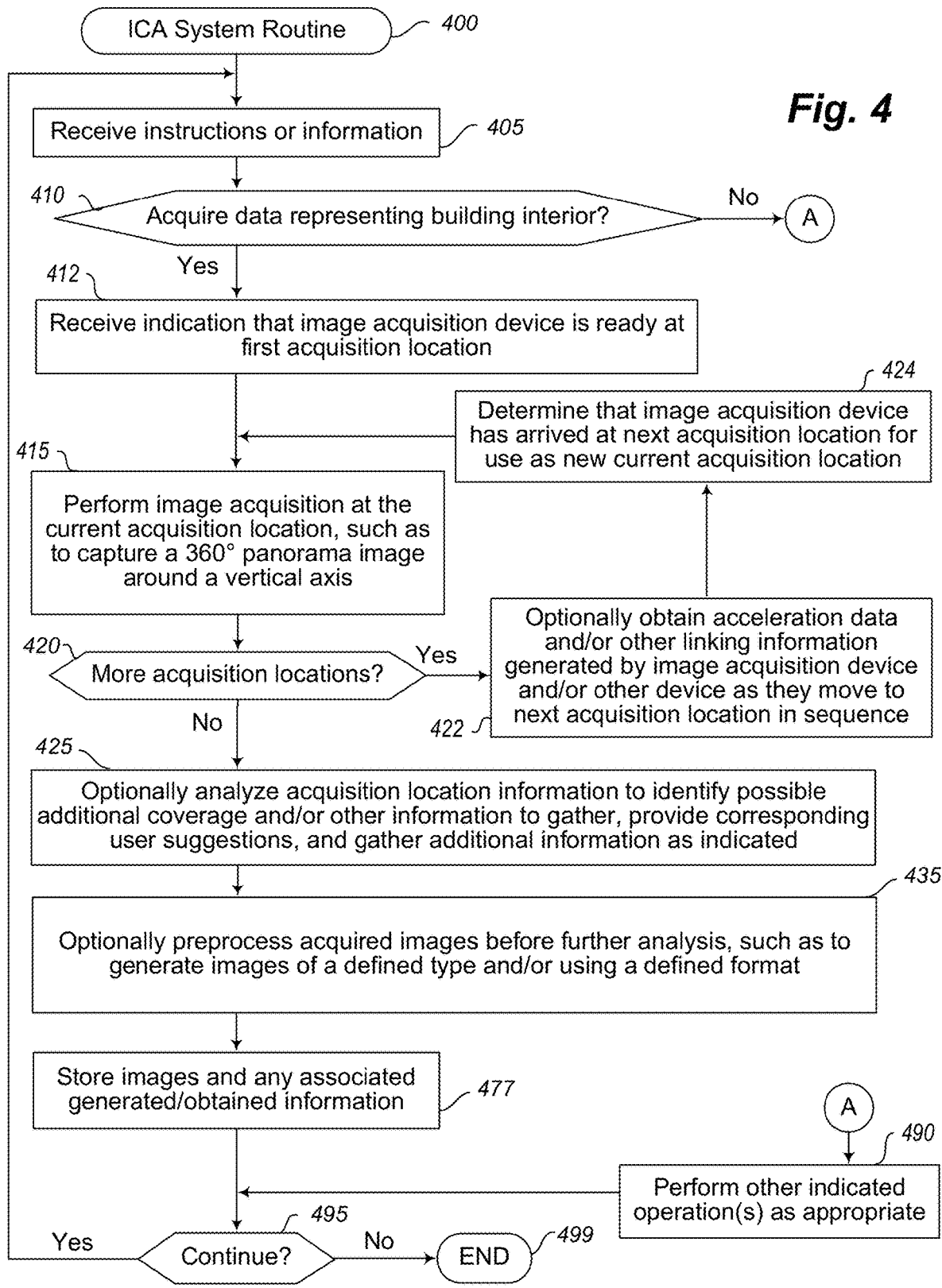
FIG. 4 illustrates an example embodiment of a flow diagram for an Image Capture and Analysis (ICA) system routine in accordance with an embodiment of the present disclosure.

FIG. 4 illustrates an example flow diagram of an embodiment of an ICA

System routine 400. The routine may be performed by, for example, the ICA System 160 of FIG. 1A, the ICA System 340 of FIG. 3, and/or an ICA system as otherwise described herein, such as to acquire 360° panorama images and/or other images at acquisition locations within buildings or other structures, such as for use in subsequent generation of related floor plans and/or other mapping information. While portions of the example routine 400 are discussed with respect to acquiring particular types of images at particular acquisition locations, it will be appreciated that this or a similar routine may be used to acquire video or other data (e.g., audio), whether instead of or in addition to such images. In addition, while the illustrated embodiment acquires and uses information from the interior of a target building, it will be appreciated that other embodiments may perform similar techniques for other types of data, including for non-building structures and/or for information external to one or more target buildings of interest. Furthermore, some or all of the routine may be executed on a mobile device used by a user to acquire image information, and/or by a system remote from such a mobile device.

The illustrated embodiment of the routine begins at block 405, where instructions or information are received. At block 410, the routine determines whether the received instructions or information indicate to acquire data representing a building interior, and if not continues to block 490. Otherwise, the routine proceeds to block 412 to receive an indication (e.g., from a user of a mobile image acquisition device) to begin the image acquisition process at a first acquisition location. After block 412, the routine proceeds to block 415 in order to perform acquisition location image acquisition activities in order to acquire a 360° panorama image for the acquisition location in the interior of the target building of interest, such as to provide horizontal coverage of at least 360° around a vertical axis. The routine may also optionally obtain annotation and/or other information from a user regarding the acquisition location and/or the surrounding environment, such as for later use in presentation of information regarding that acquisition location and/or surrounding environment.

After block 415 is completed, the routine continues to block 420 to determine if there are more acquisition locations at which to acquire images, such as based on corresponding information provided by the user of the mobile device. If so, the routine continues to block 422 to optionally initiate the capture of linking information (such as acceleration data) during movement of the mobile device along a travel path away from the current acquisition location and towards a next acquisition location within the building interior. As described elsewhere herein, the captured linking information may include additional sensor data (e.g., from one or more IMU, or inertial measurement units, on the mobile device or otherwise carried by the user) and/or additional video information, recorded during such movement. Initiating the capture of such linking information may be performed in response to an explicit indication from a user of the mobile device or based on one or more automated analyses of information recorded from the mobile device. In addition, the routine may further optionally monitor the motion of the mobile device in some embodiments during movement to the next acquisition location, and provide one or more guidance cues to the user regarding the motion of the mobile device, quality of the sensor data and/or video information being captured, associated lighting/environmental conditions, advisability of capturing a next acquisition location, and any other suitable aspects of capturing the linking information. Similarly, the routine may optionally obtain annotation and/or other information from the user regarding the travel path, such as for later use in presentation of information regarding that travel path or a resulting inter-panorama connection link. In block 424, the routine determines that the mobile device has arrived at the next acquisition location (e.g., based on an indication from the user, based on the forward movement of the user stopping for at least a predefined amount of time, etc.), for use as the new current acquisition location, and returns to block 415 in order to perform the acquisition location image acquisition activities for the new current acquisition location.

Figure 5A:
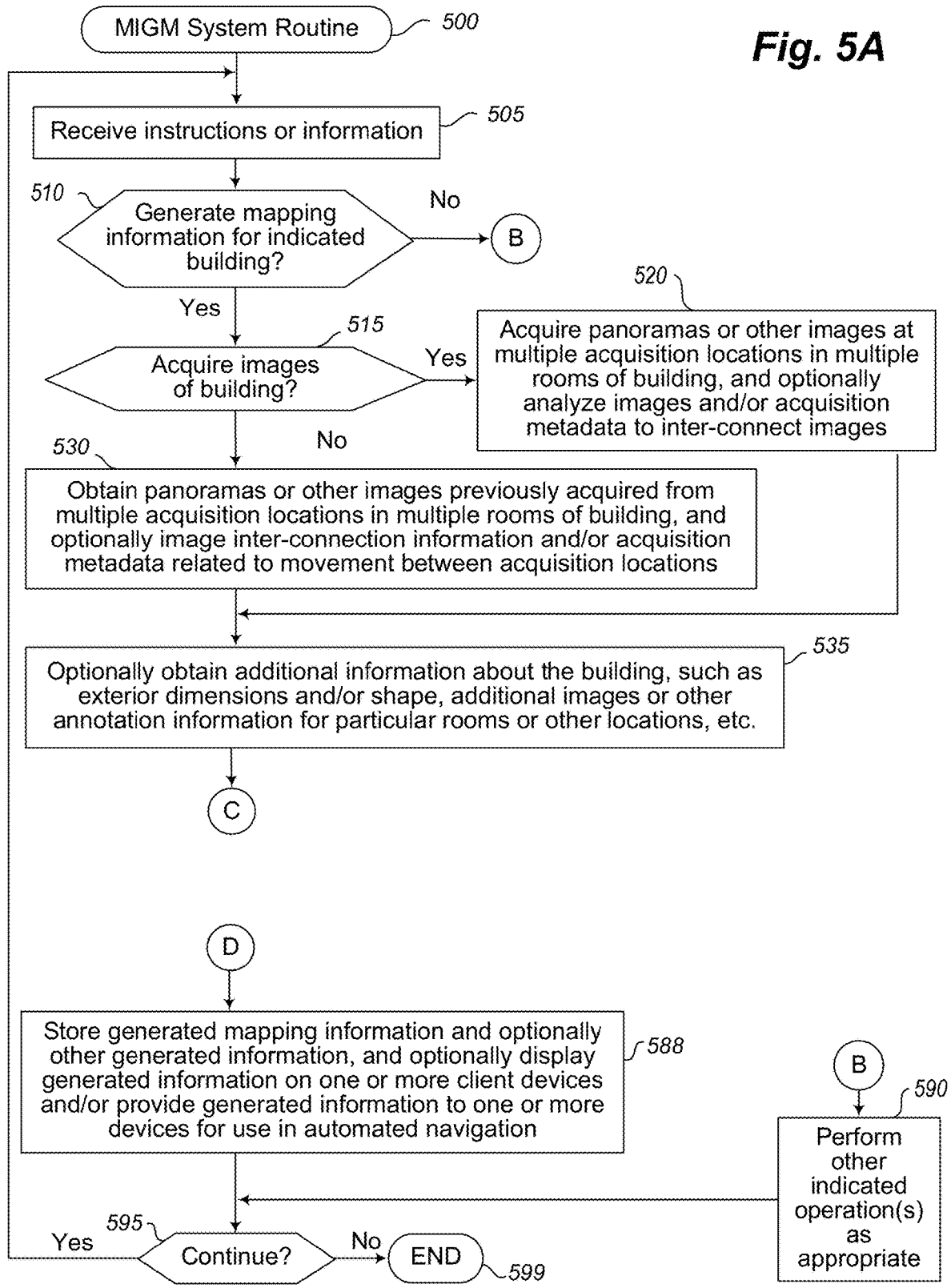

If it is instead determined in block 420 that there are not any more acquisition locations at which to acquire image information for the current building or other structure, the routine proceeds to block 425 to optionally analyze the acquisition location information for the building or other structure, such as to identify possible additional coverage (and/or other information) to acquire within the building interior. For example, the ICA system may provide one or more notifications to the user regarding the information acquired during capture of the multiple acquisition locations and optionally corresponding linking information, such as if it determines that one or more segments of the recorded information are of insufficient or undesirable quality, or do not appear to provide complete coverage of the building. After block 425, the routine continues to block 435 to optionally preprocess the acquired 360° panorama images before their subsequent use for generating related mapping information. In block 477, the images and any associated generated or obtained information is stored for later use. FIGS. 5A-5B illustrate one example of a routine for generating a floor plan representation of a building interior from such generated panorama information.

If it is instead determined in block 410 that the instructions or other information recited in block 405 are not to acquire images and other data representing a building interior, the routine continues instead to block 490 to perform any other indicated operations as appropriate, such as any housekeeping tasks, to configure parameters to be used in various operations of the system (e.g., based at least in part on information specified by a user of the system, such as a user of a mobile device who captures one or more building interiors, an operator user of the ICA system, etc.), to obtain and store other information about users of the system, to respond to requests for generated and stored information, etc.

Following blocks 477 or 490, the routine proceeds to block 495 to determine whether to continue, such as until an explicit indication to terminate is received, or instead only if an explicit indication to continue is received. If it is determined to continue, the routine returns to block 405 to await additional instructions or information, and if not proceeds to step 499 and ends.

FIGS. 5A-5B illustrate an example embodiment of a flow diagram for a Mapping Information Generation Manager (MIGM) System routine 500. The routine may be performed by, for example, execution of the MIGM system 160 of FIG. 1A, the MIGM system 345 of FIG. 3, and/or an MIGM system as described elsewhere herein, such as to generate a floor plan and optionally other mapping information for a defined area (e.g., a 3D computer model) based at least in part on images of the area. In the example of FIGS. 5A-5B, the generated mapping information includes a 2D floor plan and 3D computer model of a building, such as a house, but in other embodiments, other types of mapping information may be determined and generated for other types of buildings and used in other manners, as discussed elsewhere herein.

The illustrated embodiment of the routine begins at block 505, where information or instructions are received. The routine continues to block 510 to determine whether the instructions received in block 505 indicate to generate mapping information for an indicated building, and if so the routine continues to perform blocks 515-588 to do so, and otherwise continues to block 590.

In block 515, the routine determines whether image information is already available for the building, or if such information instead needs to be acquired. If it is determined in block 515 that the information needs to be acquired, the routine continues to block 520 to acquire such information, optionally waiting for one or more users or devices to move throughout the building and acquire panoramas or other images at multiple acquisition locations in multiple rooms of the building, and to optionally further analyze the images and/or metadata information about their acquisition to interconnect the images, as discussed in greater detail elsewhere herein—FIG. 4 provides one example embodiment of an ICA system routine for performing such image acquisition. If it is instead determined in block 515 that it is not necessary to acquire the images, the routine continues instead to block 530 to obtain existing panoramas or other images from multiple acquisition locations in multiple rooms of the building, optionally along with interconnection information for the images and acquisition of metadata information related to movement between the acquisition locations, such as may in some situations have been supplied in block 505 along with the corresponding instructions.

After blocks 520 or 530, the routine continues to block 535 to optionally obtain additional information about the building, such as from activities performed during acquisition and optionally analysis of the images, and/or from one or more external sources (e.g., online databases, information provided by one or more end users, etc.)—such additional information may include, for example, exterior dimensions and/or shape of the building, additional images and/or annotation information acquired corresponding to particular locations within the building (optionally for locations different from acquisition locations of the acquired panorama or other images), etc.

After block 535, the routine continues to block 550 to determine, for each room inside the building with one or more acquisition locations and associated acquired images, a room shape of the room for data in the image(s) taken inside the room, and optionally a position within the room of its acquisition location(s), such as in an automated manner. In block 555, the routine further uses visual data in the images and/or the acquisition metadata for them to determine, for each room in the building, any connecting passages in or out of the room (e.g., in an automated manner). In block 560, the routine further uses visual data in the images and/or the acquisition metadata for them to determine, for each room in the building, any wall elements in the room and their positions (e.g., in an automated manner), such as for windows, inter-wall borders, etc. It will be appreciated that, while blocks 550-560 are illustrated as separate operations in this example, in some embodiments a single analysis of the images may be performed to acquire or determine multiple types of information, such as those discussed with respect to blocks 550-560.

In block 565, the routine then determines estimated positions of the room shapes to create an initial 2D floor plan, such as by connecting inter-room passages in their respective rooms, by optionally positioning room shapes around determined acquisition location positions (e.g., if the acquisition location positions are inter-connected), and by optionally applying one or more constraints or optimizations. Such a floor plan may include, for example, relative position and shape information for the various rooms without providing any actual dimension information for the individual rooms or building as a whole, and may further include multiple linked or associated sub-maps (e.g., to reflect different stories, levels, sections, etc.) of the building. The routine further associates positions of the doors, wall openings and other identified wall elements on the floor plan.

After block 565, the routine optionally performs one or more steps 575-580 to determine and associate additional information with the floor plan. In block 575, the routine optionally estimates the dimensions of some or all of the rooms, such as from analysis of images and/or their acquisition metadata or from overall dimension information obtained for the exterior of the building, and associates the estimated dimensions with the floor plan—it will be appreciated that if sufficiently detailed dimension information were available, architectural drawings, blue prints, etc. may be generated from the floor plan. After block 575, the routine continues to block 580 to optionally associate further information with the floor plan (e.g., with particular rooms or other locations within the building), such as additional images and/or annotation information. In block 585, the routine further estimates heights of walls in some or all rooms, such as from analysis of images and optionally sizes of known objects in the images, as well as height information about a camera when the images were acquired, and further uses such information to generate a 3D computer model of the building, with the 3D model and the floor plan being associated with each other.

After block 585, the routine continues to block 588 to store the generated mapping information and optionally other generated information, and to optionally further use the generated mapping information, such as to provide the generated 2D floor plan and/or 3D computer model for display on one or more client devices, provide that generated information to one or more other devices for use in automating navigation of those devices and/or associated vehicles or other entities, etc.

If it is instead determined in block 510 that the information or instructions received in block 505 are not to generate mapping information for an indicated building, the routine continues instead to block 590 to perform one or more other indicated operations as appropriate. Such other operations may include, for example, receiving and responding to requests for previously generated computer models and/or floor plans and/or other generated information (e.g., requests for such information for use by an ILMM system, requests for such information for display on one or more client devices, requests for such information to provide it to one or more other devices for use in automated navigation, etc.), obtaining and storing information about buildings for use in later operations (e.g., information about dimensions, numbers or types of rooms, total square footage, adjacent or nearby other buildings, adjacent or nearby vegetation, exterior images, etc.), etc.

After blocks 588 or 590, the routine continues to block 595 to determine whether to continue, such as until an explicit indication to terminate is received, or instead only if an explicit indication to continue is received. If it is determined to continue, the routine returns to block 505 to wait for and receive additional instructions or information, and otherwise continues to block 599 and ends.

Figure 6:
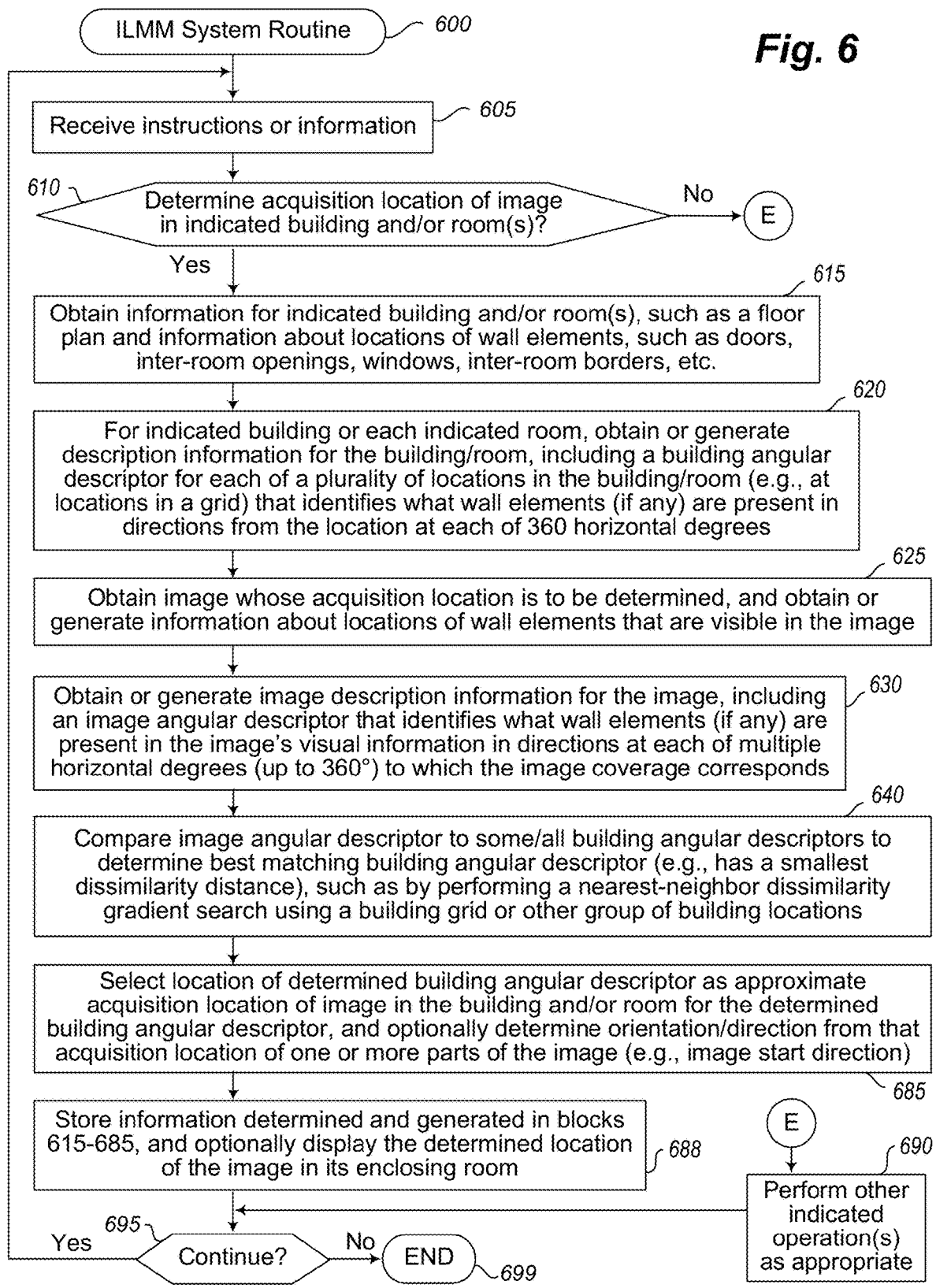
FIG. 6 illustrates an example embodiment of a flow diagram for an Image Location Mapping Manager (ILMM) system routine in accordance with an embodiment of the present disclosure.

FIG. 6 illustrates an example embodiment of a flow diagram for an Image Location Mapping Manager (ILMM) System routine 600. The routine may be performed by, for example, execution of the ILMM system 140 of FIG. 1A, the ILMM system 389 of FIG. 3, and/or an ILMM system as described with respect to FIGS. 2D-2G and elsewhere herein, such as to perform automated operations related to determining the acquisition location of an image based at least in part on an analysis of the image's contents, and to subsequently using the determined acquisition location information in one or more automated manners. In the example of FIG. 6, the acquisition location is determined with respect to a floor plan of a building, such as a house, but in other embodiments, other types of mapping information may be used for other types of structures or for non-structure locations, and the determined acquisition location information may be used in other manners than those discussed with respect to routine 600, as discussed elsewhere herein.

The illustrated embodiment of the routine begins at block 605, where information or instructions are received. The routine continues to block 610 to determine whether the instructions received in block 605 indicate to determine the acquisition location of an additional image for an indicated room and/or building, and if so the routine continues to perform blocks 615-688 to do so, and otherwise continues to block 690.

In block 615, the routine obtains information about the room and/or building indicated in block 605, such as by receiving that information in block 605 or by otherwise retrieving stored information—the obtained information may include a floor plan for the building (or a floor plan excerpt for an indicated room) along with information about the locations of wall elements in the room(s), such as for doors, inter-room wall openings, windows, inter-room borders, etc. In block 620, the routine then obtains or generates for the indicated building or room(s) (e.g., for each indicated room or each room in an indicated building), building description information that includes a building angular descriptor for each of a plurality of room locations in the building/room(s) (e.g., at room locations in a specified grid) that identifies what wall elements (if any) are present in angular directions from the room location associated with the building angular descriptor (e.g., at each of 360 horizontal degrees of angular direction).

In block 625, the routine then obtains information about the additional image whose acquisition location is to be determined, such as by receiving that image in block 605 or by otherwise retrieving a stored copy of the image, and then proceeds to obtain or generate information about locations of wall elements that are visible in the image, such as by analyzing visual information contents of the image. The routine then proceeds to block 630 to obtain or generate image description information for the image, including an image angular descriptor that identifies what wall elements (if any) are present in the image's visual contents in angular directions corresponding to those visual contents (e.g., at each of 360 horizontal degrees of angular direction, if the image is a 360° panorama image, such as relative to an angular direction determined to be a starting direction for the image).

In block 640, the routine then compares the image angular descriptor to some or all of the building angular descriptors (e.g., for all rooms, for one or more rooms to which the image may correspond, etc.) to determine a best matching building angular descriptor, such as a building angular descriptor having a smallest dissimilarity distance to the image angular descriptor. In block 685, the routine then identifies the room location to use as the determined acquisition location for the image based on the room location associated with the best match building angular descriptor, such as to use that associated room location as the determined acquisition location. In some embodiments and situations, the routine may further determine orientation and/or direction information from that determined acquisition location that corresponds to one or more parts of the image (e.g., to a starting direction for the image and/or to an ending direction for the image).

After block 685, the routine continues to block 688 to store the information that was determined and generated in blocks 615 to 685, and to optionally display the determined image acquisition location information for the image in its enclosing room on the floor map (or floor map excerpt), although in other embodiments the determined information may be used in other manners (e.g., for automated navigation of one or more devices).

If it is instead determined in block 610 that the information or instructions received in block 605 are not to determine the acquisition location of an additional image, the routine continues instead to block 690 to perform one or more other indicated operations as appropriate. Such other operations may include, for example, receiving and responding to requests for previously determined image acquisition location information and/or for associated additional images (e.g., requests for such information for display on one or more client devices, requests for such information to provide it to one or more other devices for use in automated navigation, etc.), obtaining and storing information about buildings for use in later operations (e.g., information about floor plans and associated wall element positions for rooms in the floor plan, etc.), performing geometric localization techniques to test associations of wall elements visible in an image to wall elements present in a room (whether to confirm a degree of match for a building angular descriptor that has already been determined to be a best match for an image angular descriptor and/or as part of the identification of such a best match building angular descriptor), using machine learning techniques to learn the best encoding to allow matching of an image to a room location, etc.

After blocks 688 or 690, the routine continues to block 695 to determine whether to continue, such as until an explicit indication to terminate is received, or instead only if an explicit indication to continue is received. If it is determined to continue, the routine returns to block 605 to wait for and receive additional instructions or information, and otherwise continues to block 699 and ends.

Figure 7:
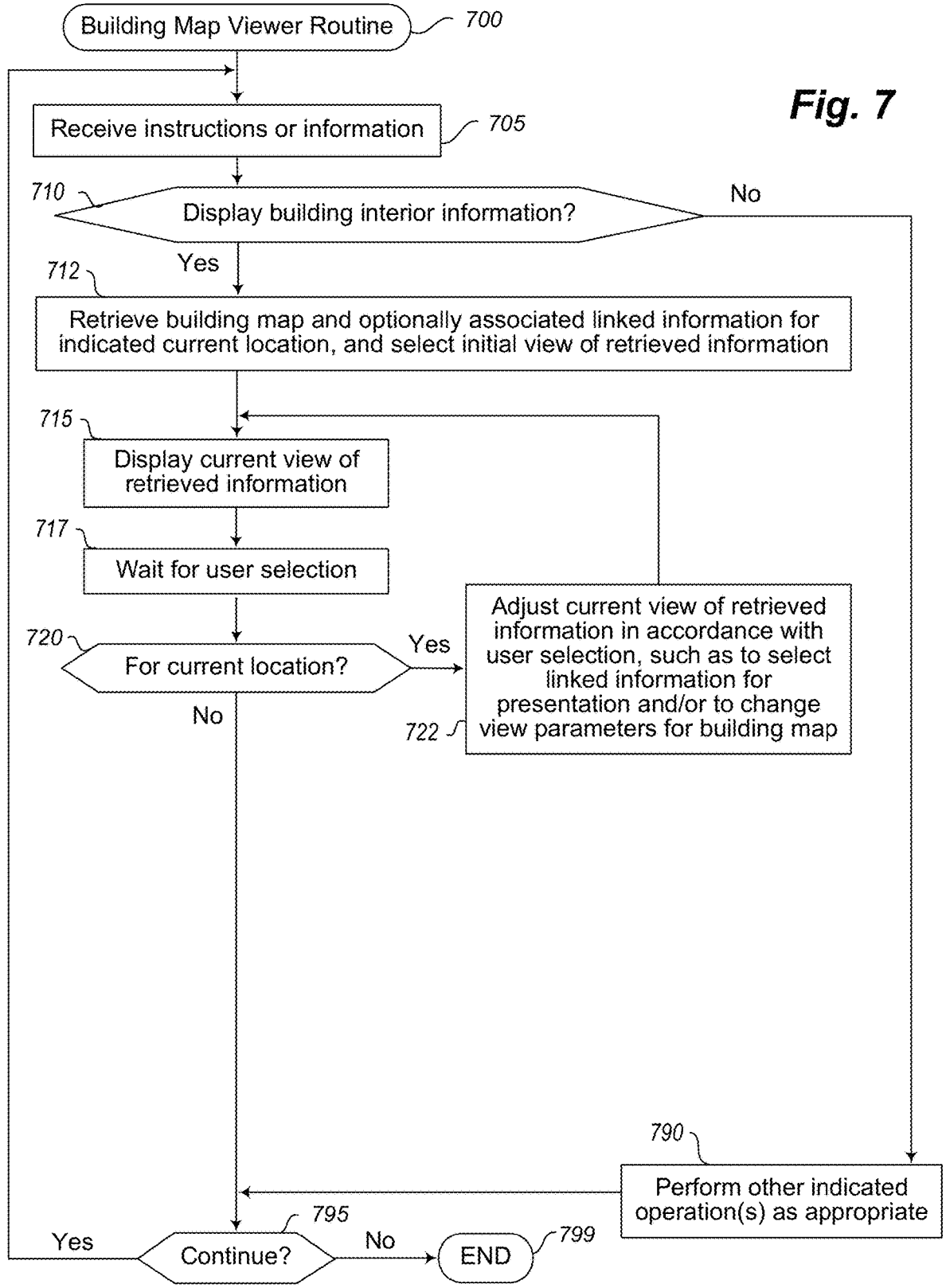
FIG. 7 illustrates an example embodiment of a flow diagram for a Building Map Viewer system routine in accordance with an embodiment of the present disclosure.

FIG. 7 illustrates an example embodiment of a flow diagram for a Building Map Viewer system routine 700. The routine may be performed by, for example, execution of a map viewer client computing device 175 and its software system(s) (not shown) of FIG. 1A, a client computing device 390 of FIG. 3, and/or a mapping information viewer or presentation system as described elsewhere herein, such as to receive and display mapping information (e.g., a 3D computer model, a 2.5D computer model, a 2D floor plan, etc.) for a defined area that includes visual indications of one or more determined image acquisition locations, as well as to optionally display additional information (e.g., images) associated with particular locations in the mapping information. In the example of FIG. 7, the presented mapping information is for the interior of a building (such as a house), but in other embodiments, other types of mapping information may be presented for other types of buildings or environments and used in other manners, as discussed elsewhere herein.

The illustrated embodiment of the routine begins at block 705, where instructions or information are received. At block 710, the routine determines whether the received instructions or information indicate to display or otherwise present information representing a building interior, and if not continues to block 790. Otherwise, the routine proceeds to block 712 to retrieve a floor plan and/or other generated mapping information (e.g., a 3D computer model) for the building and optionally indications of associated linked information for the building interior and/or a surrounding location, and selects an initial view of the retrieved information (e.g., a view of the floor plan, of at least some of the 3D computer model, etc.). In block 715, the routine then displays or otherwise presents the current view of the retrieved information, and waits in block 717 for a user selection. After a user selection in block 717, if it is determined in block 720 that the user selection corresponds to the current location (e.g., to change the current view), the routine continues to block 722 to update the current view in accordance with the user selection, and then returns to block 715 to update the displayed or otherwise presented information accordingly. The user selection and corresponding updating of the current view may include, for example, displaying or otherwise presenting a piece of associated linked information that the user selects (e.g., a particular image associated with a displayed visual indication of a determined acquisition location), changing how the current view is displayed (e.g., zooming in or out; rotating information if appropriate; selecting a new portion of the floor plan and/or 3D computer model to be displayed or otherwise presented, such as with some or all of the new portion not being previously visible, or instead with the new portion being a subset of the previously visible information; etc.).

If it is instead determined in block 710 that the instructions or other information received in block 705 are not to present information representing a building interior, the routine continues instead to block 790 to perform any other indicated operations as appropriate, such as any housekeeping tasks, to configure parameters to be used in various operations of the system (e.g., based at least in part on information specified by a user of the system, such as a user of a mobile device who captures one or more building interiors, an operator user of the ILMM system, etc.), to obtain and store other information about users of the system, to respond to requests for generated and stored information, etc.

Following block 790, or if it is determined in block 720 that the user selection does not correspond to the current location, the routine proceeds to block 795 to determine whether to continue, such as until an explicit indication to terminate is received, or instead only if an explicit indication to continue is received. If it is determined to continue (e.g., if the user made a selection in block 717 related to a new location to present), the routine returns to block 705 to await additional instructions or information (or to continue on to block 712 if the user made a selection in block 717 related to a new location to present), and if not proceeds to step 799 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
    obtaining, by one or more computing devices, and for a house with multiple rooms, a floor plan of the house that has associated information about doors and windows and inter-wall borders of the multiple rooms;
    generating, by the one or more computing devices, visual description information for the house, including:
        specifying a grid in the house having a plurality of room locations;
        determining, for each of the room locations, angular directions from the room location in 360 horizontal degrees to multiple visible wall elements of walls of one or more rooms of the house, the multiple visible wall elements including at least one door and at least one window and multiple inter-wall borders; and
        generating building angular descriptors for the room locations, wherein each building angular descriptor is associated with one of the room locations and encodes the determined angular directions for the associated room location;
    generating, by the one or more computing devices, an image angular descriptor for a panorama image taken in the one room with 360 horizontal degrees of visual information, wherein the image angular descriptor encodes information identifying specified directions within the visual information to the multiple wall elements of the walls of one room of the house;
    comparing, by the one or more computing devices, the image angular descriptor to the building angular descriptors to determine one of the building angular descriptors whose encoded information best matches the encoded information of the image angular descriptor;
    associating, by the one or more computing devices and based on the comparing, the panorama image with a determined position on the floor plan, wherein the determined position includes the room location in the one room associated with the determined one building angular descriptor and further includes orientation information to correlate the determined angular directions for that room location to the identified specified directions for the panorama image; and
    using, by the one or more computing devices, the determined position of the panorama image on the floor plan of the house for navigation of at least the one room of the house.

2. The computer-implemented method of claim 1 further comprising using, by the one or more computing devices, the floor plan to further control navigation activities by an autonomous vehicle, including providing the floor plan for use by the autonomous vehicle in moving between the multiple rooms of the house.

3. The computer-implemented method of claim 1 wherein the using of the determined position further includes displaying, by the one or more computing devices, the floor plan showing the multiple rooms and including one or more visual indications on the displayed floor plan of the determined position and the orientation information for the panorama image in the one room.

4. The computer-implemented method of claim 3 further comprising capturing, by one or more recording devices, multiple panorama images within the multiple rooms of the house, and wherein the generating of the image angular descriptor and the comparing and the associating and the including of the visual indication on the displayed floor plan is performed for each of the multiple panorama images.

5. A computer-implemented method comprising:
    obtaining, by a computing device, visual description information for a building that includes building angular descriptors for a plurality of room locations in the building, wherein each building angular descriptor is associated with one of the room locations and has angular information about wall elements of walls that are visible at specified angular directions from the associated room location;

generating, by the computing device, an image angular descriptor for a panorama image that is taken in a room of the building and that includes visual information about at least some of the walls of the room, wherein the image angular descriptor includes information identifying wall elements of the walls of the room that are visible at specified directions within the visual information of the panorama image;

comparing, by the computing device, the image angular descriptor to the building angular descriptors to determine one of the building angular descriptors that is in the room and has angular information best matching the information included in the image angular descriptor;

associating, by the computing device and based on the comparing, the panorama image with a determined position and orientation in the room, the determined position including the room location with which the determined one building angular descriptor is associated, and the determined orientation identifying at least one direction from that room location corresponding to a specified part of the visible information in the panorama image; and presenting, by the computing device, and for the building, a floor plan of the building that shows the room with a visual indication identifying at least the determined position for the panorama image, to cause use of the presented floor plan for navigating the building.

6. The computer-implemented method of claim 5 wherein the presenting of the floor plan further includes visually indicating the determined orientation, and wherein the method further comprises presenting, by the computing device and in response to a user selection of the visual indication on the presented floor plan, at least a portion of the panorama image corresponding to the determined orientation.

7. The computer-implemented method of claim 5 wherein the visual information of the panorama image includes 360 horizontal degrees of visual coverage from an acquisition location of the panorama image, wherein the image angular descriptor includes, for each of the 360 horizontal degrees of visual coverage from the acquisition location, an indication of any wall elements of the walls of the room that are visible in a direction from the acquisition location corresponding to the horizontal degree of visual coverage, and wherein each of the building angular descriptors includes, for each of 360 horizontal degrees from the room location associated with the building angular descriptor, an indication of any wall elements of the walls of a surrounding room that are visible in a direction from the that room location corresponding to the horizontal degree of visual coverage.

8. The computer-implemented method of claim 7 wherein the wall elements of the walls of the surrounding room include at least one door, at least one window, and at least one inter-wall border.

9. The computer-implemented method of claim 7 further comprising determining the one building angular descriptor having angular information best matching the information included in the image angular descriptor by performing the generating and the comparing without using any depth information acquired from any depth sensor about a depth from the acquisition location to the walls of the room.

10. The computer-implemented method of claim 7 further comprising selecting the plurality of room locations in the building by specifying a grid of room locations covering floors of at least some rooms of multiple rooms of the building, wherein a room location in the grid that is closest to a corner of a room has at least two neighbor room locations in the grid, wherein a room location in the grid that is closest to a wall of a room without being in a corner of the room has at least three neighbor room locations in the grid, and wherein a room location in the grid that is not closest to a wall of a room has at least four neighbor room locations in the grid.

11. The computer-implemented method of claim 10 wherein the comparing of the image angular descriptor to the building angular descriptors includes performing a nearest-neighbor search of the room locations of the grid, including identifying the determined one building angular descriptor by repeatedly moving from at least one current room location in the grid to at least one neighbor room location in the grid if the at least one neighbor room location has a smaller dissimilarity with the image angular descriptor than does the at least one current room location.

12. The computer-implemented method of claim 7 wherein the comparing of the image angular descriptor to the building angular descriptors further includes:

analyzing the visual information to identify, for a characteristic of a specified type of a wall of the room, at least one of the 360 horizontal degrees of visual coverage from the acquisition location for which the characteristic is present;

for each of at least some of the building angular descriptors, comparing the image angular descriptor to the building angular descriptor by:

identifying one or more of the 360 horizontal degrees from the room location associated with the building angular descriptor at which the characteristic is present; and synchronizing locations of each of the identified at least one of the 360 horizontal degrees of visual coverage from the acquisition location to locations of each of the identified one or more 360 horizontal degrees from the room location to determine if, relative to the synchronized locations, information at other horizontal degrees of coverage in the image angular descriptor matches information at other horizontal degrees of coverage in the building angular descriptor; and selecting one of the at least some building angular descriptors as the determined one building angular descriptor based on the selected one building angular descriptor having an identified synchronized location for which the information at the other horizontal degrees of coverage in the building angular descriptor best matches the information at the other horizontal degrees of coverage in the image angular descriptor, and using the identified synchronized location to determine the orientation in the room for the panorama image.

13. The computer-implemented method of claim 12 wherein the characteristic of the specified type is one of a visible wall being orthogonal to a line along an identified horizontal degree of visual coverage, or a specified type of wall element being visible at the identified horizontal degree of visual coverage.

14. The computer-implemented method of claim 5 wherein the comparing of the image angular descriptor to the building angular descriptors includes, for each of at least some of the building angular descriptors, determining a probability that the image angular descriptor and the building angular descriptor are a match by differing less than a specified threshold, and selecting one of the at least some building angular descriptors that has a highest probability of matching the image angular detector as the determined one building angular descriptor.

15. The computer-implemented method of claim 5 wherein the comparing of the image angular descriptor to the building angular descriptors includes, for each of at least some of the building angular descriptors, using a circular earth mover's distance measurement of a distance between the image angular descriptor and the building angular descriptor, and selecting one of the at least some building angular descriptors that has a smallest measured distance to the image angular detector as the determined one building angular descriptor.

16. The computer-implemented method of claim 5 wherein the associating of the panorama image with the determined position and orientation further includes, by the computing device:
   generating additional visual information for the determined one building angular descriptor that represents a view from the room location with which the determined one building angular descriptor is associated and that includes the wall elements of the walls of the room that are visible at the specified angular directions for the determined one building angular descriptor; and
   comparing similarity of the visual information of the panorama image to the generated additional visual information for the determined one building angular descriptor to confirm that the similarity exceeds a specified threshold.

17. The computer-implemented method of claim 5 wherein the comparing of the image angular descriptor to the building angular descriptors includes using machine learning to identify the determined one building angular descriptor as being most similar to the image angular descriptor.

18. A non-transitory computer-readable medium having stored contents that cause one or more computing devices to perform automated operations including at least:
   obtaining, by the one or more computing devices, and for an image that includes visual information about at least some of a building, an angular descriptor for the image that includes information identifying elements visible for the building at specified directions within the visual information;
   obtaining, by the one or more computing devices, additional angular descriptors that are each associated with a building location and include angular information about elements visible at specified angular directions from the associated building location;
   comparing, by the one or more computing devices, the angular descriptor for the image to the additional angular descriptors to determine one of the additional angular descriptors that has angular information best matching the information included in the angular descriptor for the image;
   associating, by the one or more computing devices, the image with a determined position for the building that is based on the associated building location for the determined one additional angular descriptor; and
   providing, by the one or more computing devices, information for the image about the determined position for the building.

19. The non-transitory computer-readable medium of claim 18 wherein the image is a panorama image with 360 degrees horizontally of visual information, wherein the obtaining of the angular descriptor for the image includes generating the angular descriptor by the one or more computing devices via analysis of the image, and wherein the providing of the information about the determined position for the image includes presenting a floor plan for the building that includes a visual indication of the determined position for the image.

20. The non-transitory computer-readable medium of claim 18 wherein the elements visible for the building at the specified directions within the visual information are wall elements that include multiple of a door or a window or an inter-wall border, wherein the elements visible at the specified angular directions from the associated building location for the determined one additional angular descriptor are the wall elements, and wherein the providing of the information about the determined position for the image includes presenting a floor plan for the building that includes visual indication of the determined position for the image.

21. The non-transitory computer-readable medium of claim 18 wherein the visual information for the image has less than 360 horizontal degrees of coverage, wherein the determined one additional angular descriptor is for a panorama image that is taken at the determined position and that has 360 horizontal degrees of coverage, and wherein the comparing of the angular descriptor for the image to the additional angular descriptors includes matching the angular description for the image to a subset of the determined one additional angular descriptor for the panorama image.

22. A system comprising:
   one or more hardware processors of one or more computing devices; and
   one or more memories with stored instructions that, when executed by at least one of the one or more hardware processors, cause at least one of the one or more computing devices to perform automated operations including at least:
      obtaining description information for a room that includes building angular descriptors for a plurality of room locations in the room, wherein each building angular descriptor is associated with one of the room locations and has angular information about elements that are identifiable in the room at specified angular directions from the associated room location;
      generating an additional angular descriptor for information recorded at a recording location in the room, wherein the additional angular descriptor includes information identifying elements that are identifiable in the room from the recorded information at specified directions from the recording location;
      comparing the additional angular descriptor to the building angular descriptors to determine one of the building angular descriptors that has angular information best matching the information included in the additional angular descriptor;
      associating, based on the comparing, the recorded information with a position in the room that is determined for the recording location based on the room location associated with the determined one building angular descriptor; and
      providing information about the determined position in the room for the recorded information.

23. The system of claim 22 wherein the recorded information includes a panorama image with visual information, wherein the elements identifiable in the room from the recorded information include a group of wall elements having multiple of a door or a window or an inter-wall border that are visible in the visual information, wherein the elements identifiable in the room at the specified angular directions from the associated room location for the determined one building angular descriptor include the wall elements, and wherein the providing of the information about the determined position in the room includes presenting a floor plan for a building that includes the room, wherein the presented floor plan includes a visual indication of the determined position in the room.

* * * * *